United States Patent
Satoh et al.

(10) Patent No.: US 9,852,522 B2
(45) Date of Patent: Dec. 26, 2017

(54) IMAGE DECODER, GRAPHICS PROCESSING SYSTEM, IMAGE DECODING METHOD, AND GRAPHICS PROCESSING METHOD

(71) Applicant: Sony Computer Entertainment Inc., Tokyo (JP)

(72) Inventors: Jin Satoh, Tochigi (JP); Takehiro Tominaga, Tokyo (JP); Tomochika Kanakogi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 150 days.

(21) Appl. No.: 14/637,737

(22) Filed: Mar. 4, 2015

(65) Prior Publication Data
US 2015/0262385 A1    Sep. 17, 2015

(30) Foreign Application Priority Data

Mar. 17, 2014  (JP) .................................. 2014-054021
Sep. 30, 2014  (JP) .................................. 2014-200724

(51) Int. Cl.
*G06T 11/00*    (2006.01)
*H04N 19/91*    (2014.01)
(Continued)

(52) U.S. Cl.
CPC .......... *G06T 11/001* (2013.01); *H04N 19/436* (2014.11); *H04N 19/44* (2014.11);
(Continued)

(58) Field of Classification Search
None
See application file for complete search history.

(56) References Cited

U.S. PATENT DOCUMENTS 4,626,829 A * 12/1986 Hauck ..................... G06T 9/005
                                                        341/106
5,845,083 A * 12/1998 Hamadani .............. H04N 19/61
                                                        348/403.1
(Continued)

FOREIGN PATENT DOCUMENTS

JP        05176187 A    7/1993
JP        1996163560 A  6/1996
(Continued)

OTHER PUBLICATIONS

Office Action for corresponding JP Patent Application No. 2014-054021, 7 pages, dated Jan. 12, 2016.

*Primary Examiner* — Nicholas R Wilson
(74) *Attorney, Agent, or Firm* — Matthew B. Dernier, Esq.

(57) ABSTRACT

There is provided a graphics processing system that allows decompression of a compressed texture with high efficiency. The graphics processing system includes: a main memory; and a graphics processing unit, in which the graphics processing unit includes a run length decoding section adapted to run-length-decode a compressed texture, and a reciprocal spatial frequency conversion section adapted to restore the texture by performing reciprocal spatial frequency conversion on the run-length-decoded texture, and the main memory includes a texture pool adapted to partially cache the restored texture.

7 Claims, 21 Drawing Sheets

(51) Int. Cl.
*H04N 19/44* (2014.01)
*H04N 19/436* (2014.01)
*H04N 19/93* (2014.01)
*H04N 19/625* (2014.01)
*G09G 5/36* (2006.01)

(52) U.S. Cl.
CPC ........... *H04N 19/625* (2014.11); *H04N 19/91* (2014.11); *H04N 19/93* (2014.11); *G09G 5/363* (2013.01); *G09G 2340/02* (2013.01)

(56) References Cited

U.S. PATENT DOCUMENTS

| | | | | |
|---|---|---|---|---|
| 5,864,342 | A | * | 1/1999 | Kajiya ................. G06T 11/001 345/418 |
| 6,157,743 | A | | 12/2000 | Goris |
| 7,050,063 | B1 | | 5/2006 | Mantor |
| 7,209,059 | B2 | * | 4/2007 | Lim ..................... H03M 7/425 341/65 |
| 7,457,363 | B2 | * | 11/2008 | Partiwala .............. H03M 7/425 375/253 |
| 7,609,263 | B2 | | 10/2009 | Nagasaki |
| 8,429,299 | B2 | | 4/2013 | Chan |
| 2006/0176316 | A1 | | 8/2006 | Nagasaki |
| 2010/0088733 | A1 | | 4/2010 | Chan |
| 2010/0135418 | A1 | * | 6/2010 | Zhang ................... H04N 19/44 375/240.25 |
| 2011/0190052 | A1 | * | 8/2011 | Takeda .................. A63F 13/02 463/31 |
| 2014/0198122 | A1 | * | 7/2014 | Grossman ............. G06T 11/001 345/582 |

FOREIGN PATENT DOCUMENTS

| | | |
|---|---|---|
| JP | 09247138 A | 9/1997 |
| JP | 199856387 A | 2/1998 |
| JP | 2000057369 A | 2/2000 |
| JP | 2004110850 A | 4/2004 |
| JP | 2006221418 A | 8/2006 |
| JP | 2012504918 A | 2/2012 |

* cited by examiner

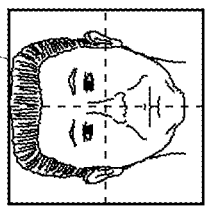
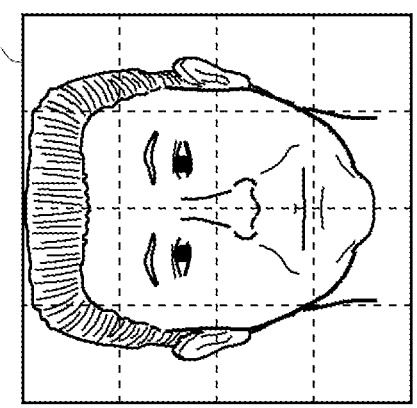
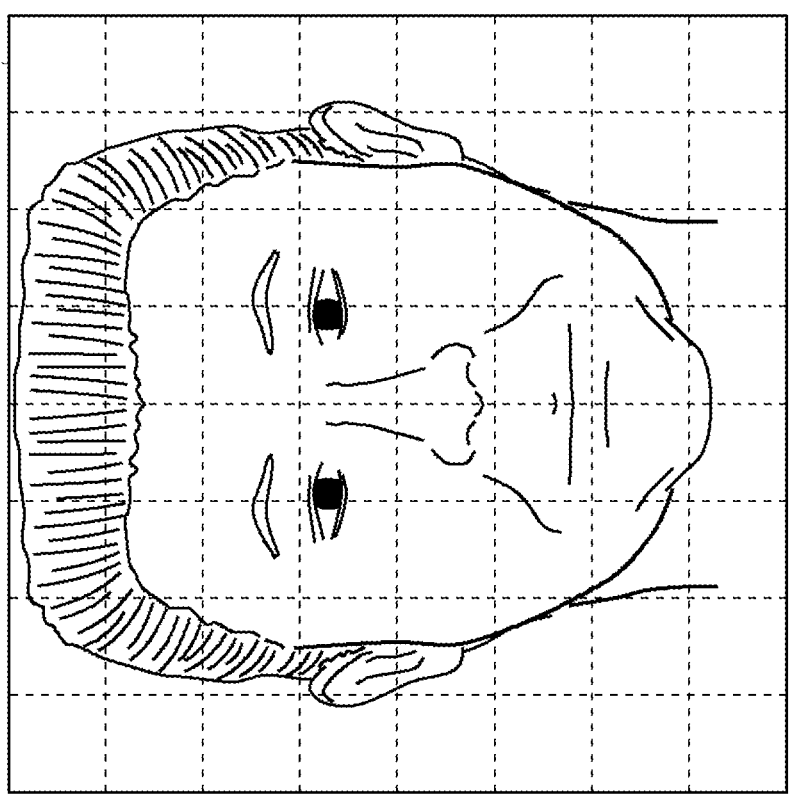
FIG. 2C
FIG. 2B
FIG. 2A

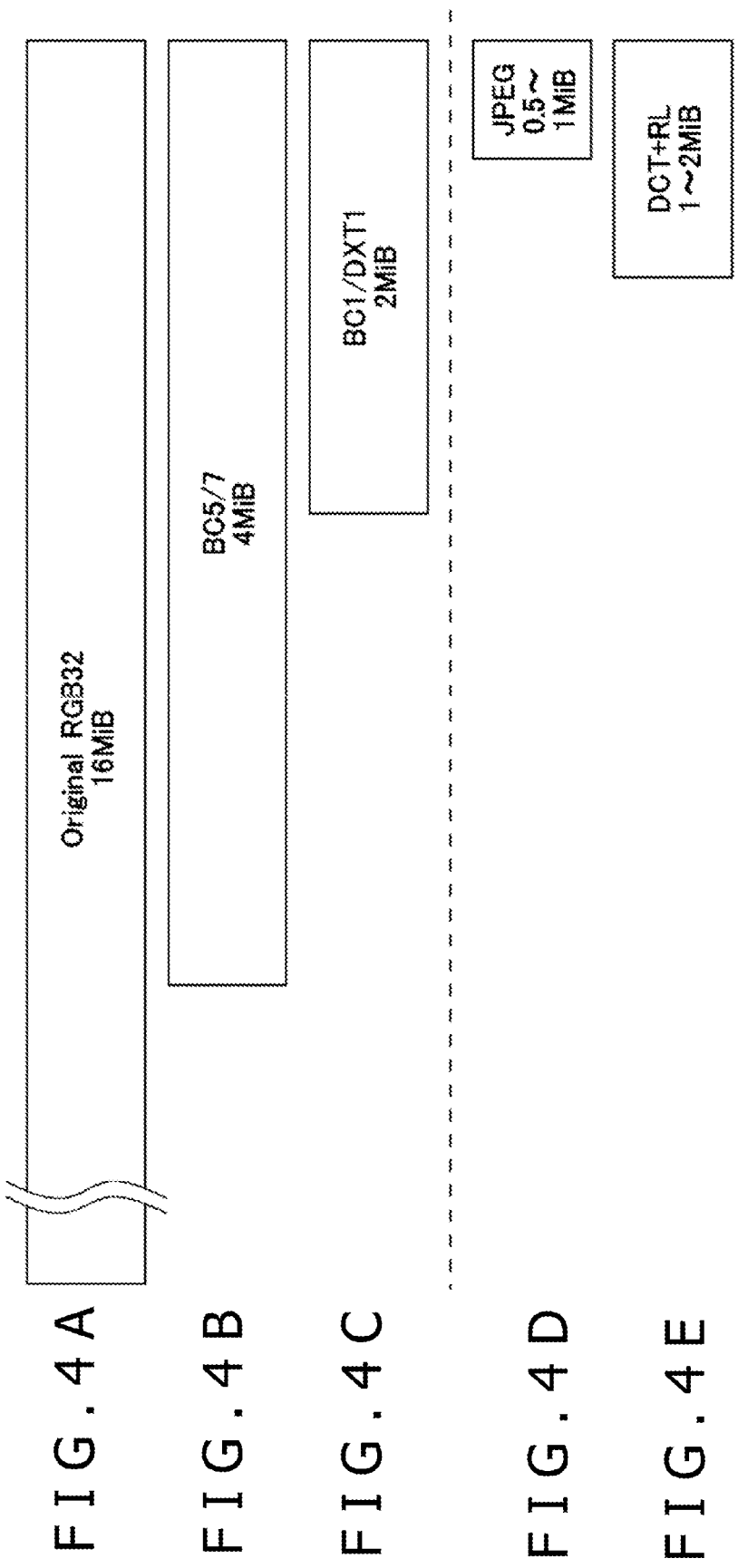

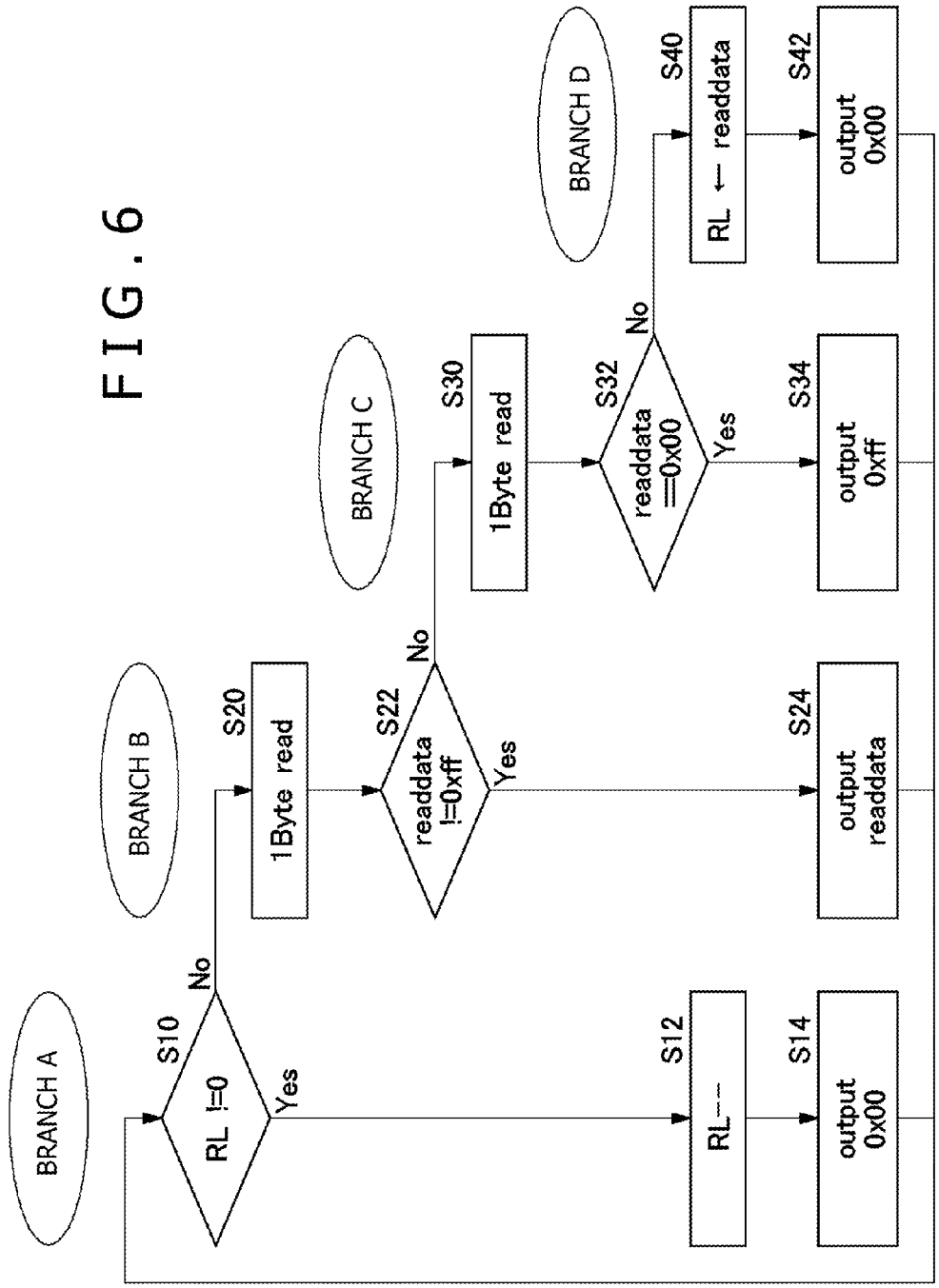

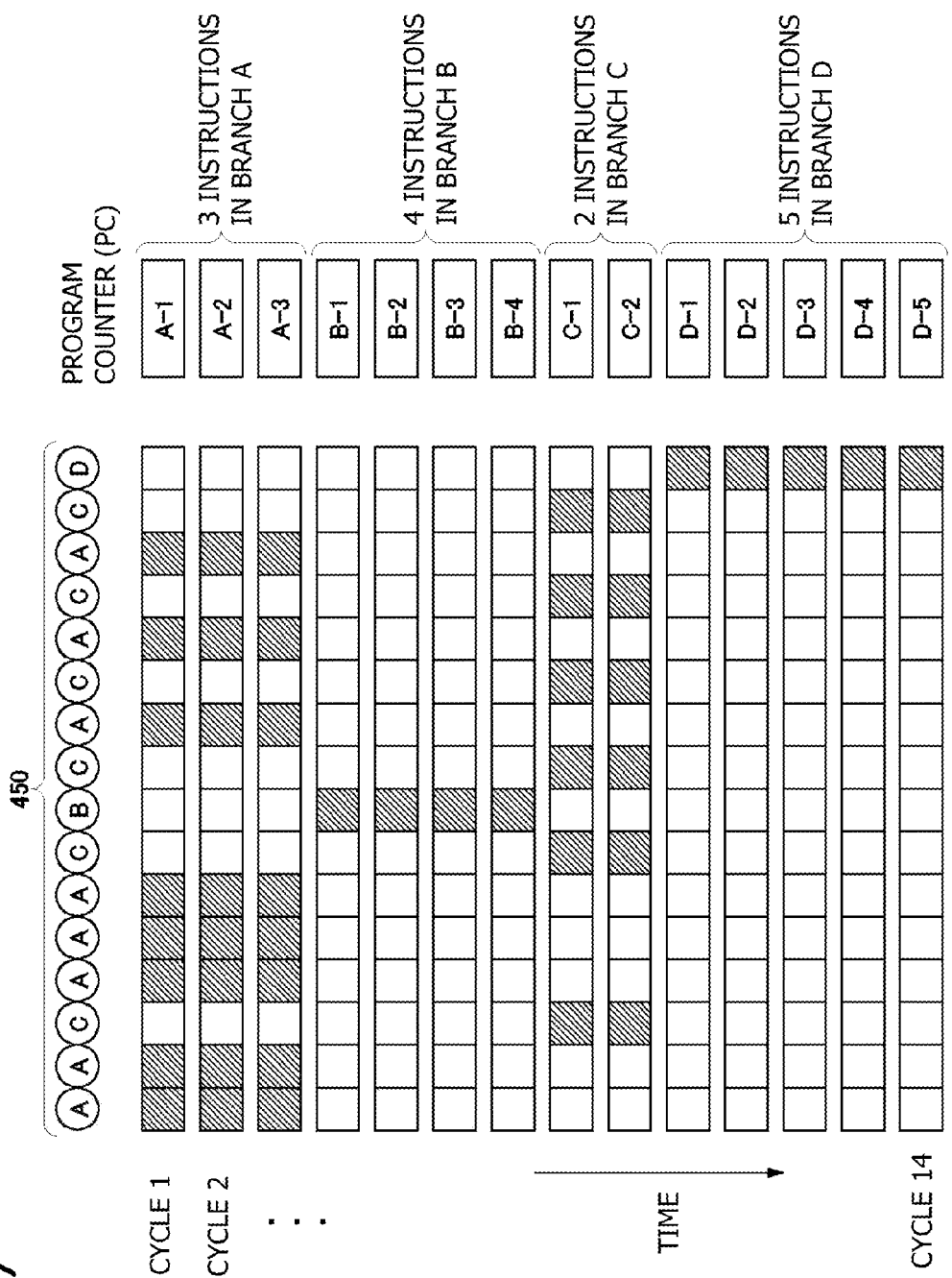

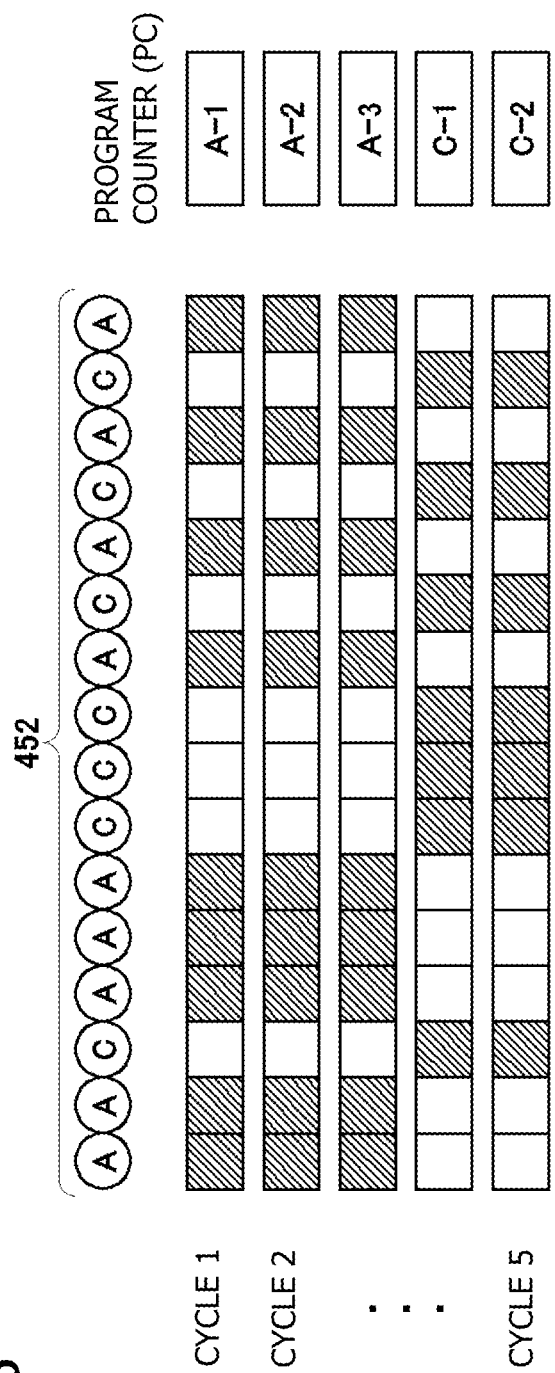

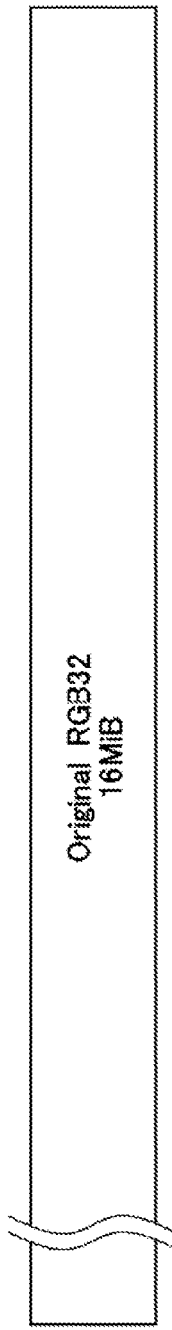
F I G . 1 0 A
F I G . 1 0 B
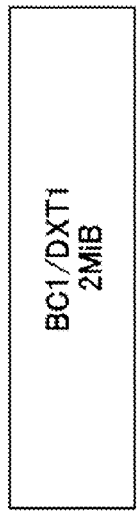
F I G . 1 0 C
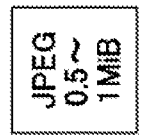
F I G . 1 0 D
F I G . 1 0 E
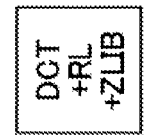
F I G . 1 0 F

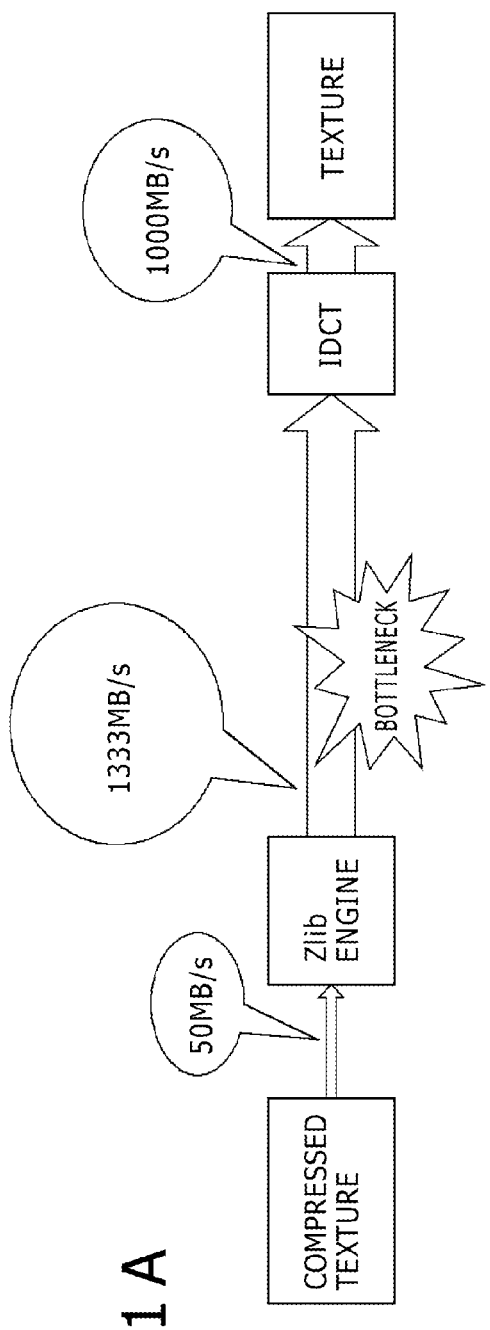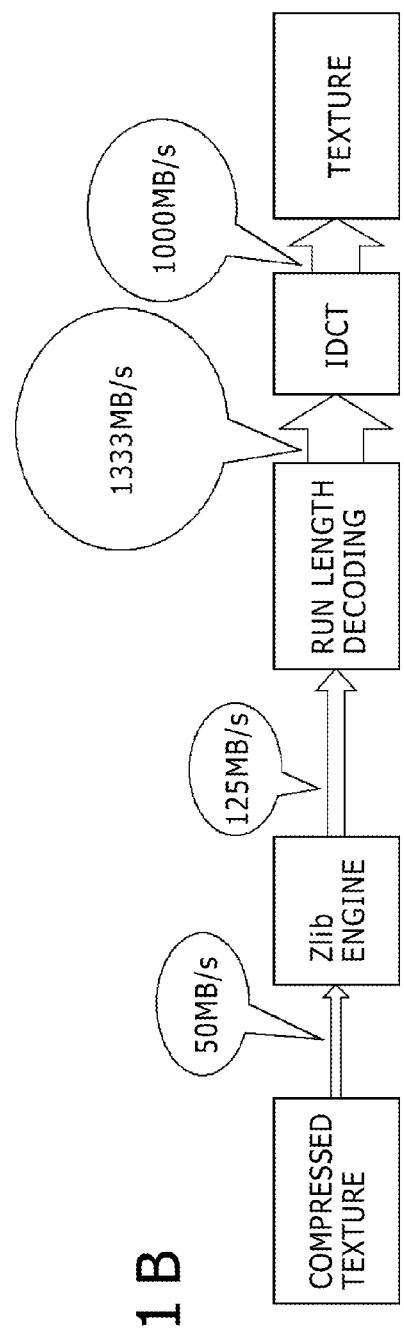
FIG. 11A
FIG. 11B

FIG. 14

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Run | Level | BIT LENGTH | NUMBER OF APPEARANCES | TOTAL BIT COUNT |
|---|---|---|---|---|---|---|---|---|---|---|---|---|---|---|---|---|---|---|---|---|---|---|---|---|---|---|---|---|---|---|---|---|---|---|
| Code 1 | 1 | R | R | s | L | L | | | | | | | | | | | | | | | | | | | | | | | | 0-3 | 0-3 | 6 | 7,200 | 43,200 |
| Code 2 | 0 | 1 | R | R | R | R | R | R | L | L | L | L | L | | | | | | | | | | | | | | | | | 0-31 | 0-31 | 13 | 810 | 10,530 |
| Code 3 | 0 | 0 | 1 | R | R | R | R | R | R | R | R | s | L | L | L | L | L | L | L | L | L | L | L | L | | | | | | 0-255 | 0-4095 | 24 | 62 | 1,488 |
| Code 4 | 0 | 0 | 0 | 1 | | | | | | | | | | | | | | | | | | | | | | | | | | EOB | 0 | 4 | 260 | 1,040 |
| | | | | | | | | | | | | | | | | | | | | | | | | | | | | | | | | | | 56,258 |

FIG. 15

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Run | Level | BIT LENGTH | NUMBER OF APPEARANCES | TOTAL BIT COUNT |
|---|---|---|---|---|---|---|---|---|---|---|---|---|---|---|---|---|---|---|---|---|---|---|---|---|---|---|---|---|---|---|---|---|---|---|
| Code 1 | 1 | 0 | s | | | | | | | | | | | | | | | | | | | | | | | | | | | 0,1 | 1 | 3 | 3,900 | 11,700 |
| Code 2 | 0 | 1 | R | R | s | L | L | | | | | | | | | | | | | | | | | | | | | | | 0-3 | 0-3 | 7 | 3,300 | 23,100 |
| Code 3 | 0 | 0 | 1 | R | R | R | R | R | R | L | L | L | L | L | | | | | | | | | | | | | | | | 0-31 | 0-31 | 14 | 810 | 11,340 |
| Code 4 | 0 | 0 | 0 | 1 | R | R | R | R | R | R | R | R | R | s | L | L | L | L | L | L | L | L | L | L | L | | | | | 0-255 | 0-4095 | 25 | 62 | 1,550 |
| Code 5 | 0 | 0 | 0 | 0 | 1 | | | | | | | | | | | | | | | | | | | | | | | | | EOB | 0 | 5 | 260 | 1,300 |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Run | Level | BIT LENGTH | NUMBER OF APPEARANCES | TOTAL BIT COUNT |
|---|---|---|---|---|---|---|---|---|---|---|---|---|---|---|---|---|---|---|---|---|---|---|---|---|---|---|---|---|---|---|---|---|---|---|
| Code 1 | 1 | - | R | s | | | | | | | | | | | | | | | | | | | | | | | | | | 0,1 | 1 | 3 | 3,900 | 11,700 |
| Code 2 | 0 | 0 | 1 | R | s | L | | | | | | | | | | | | | | | | | | | | | | | | 0,1 | 2,3 | 6 | 2,800 | 16,800 |
| Code 3 | 0 | 0 | 1 | R | R | s | L | L | | | | | | | | | | | | | | | | | | | | | | 2,3,4,5 | 1,2,3,4 | 8 | 600 | 4,800 |
| Code 4 | 0 | 0 | 0 | 1 | R | s | L | L | | | | | | | | | | | | | | | | | | | | | | 0,1 | 4,5,6,7 | 8 | 200 | 1,600 |
| Code 5 | 0 | 0 | 0 | 1 | R | R | s | L | L | | | | | | | | | | | | | | | | | | | | | 6,7,8,9 | 1,2,3,4 | 9 | 260 | 2,340 |
| Code 6 | 0 | 0 | 0 | 0 | 0 | 1 | R | R | R | R | R | R | s | | | | | | | | | | | | | | | | | 10-73 | 1 | 12 | 100 | 1,200 |
| Code 7 | 0 | 0 | 0 | 0 | 1 | 1 | R | R | R | R | R | L | L | L | L | L | s | | | | | | | | | | | | | 0-31 | 0-31 | 16 | 150 | 2,400 |
| Code 8 | 0 | 0 | 0 | 0 | 1 | R | L | L | L | L | L | L | L | L | L | L | L | L | | | | | | | | | | | | 0 | 0-4095 | 18 | 60 | 1,080 |
| Code 9 | 0 | 0 | 0 | 0 | 0 | 1 | | | | | | | | | | | | | | | | | | | | | | | | EOB | 0 | 6 | 260 | 1,560 |
| Code 10 | 0 | 0 | 0 | 0 | 0 | 0 | 1 | R | R | R | R | R | R | R | R | s | L | L | L | L | L | L | L | L | L | L | L | L | | 0-255 | 0-4095 | 28 | 2 | 56 |
| | | | | | | | | | | | | | | | | | | | | | | | | | | | | | | | | | 8,332 | 43,536 |

FIG. 19

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Run | Level | BIT LENGTH |
|---|---|---|---|---|---|---|---|---|---|---|---|---|---|---|---|---|---|---|---|---|---|---|---|---|---|---|---|---|---|---|---|---|
| Code 1 | 1 | R | s | | | | | | | | | | | | | | | | | | | | | | | | | | | 0,1 | 1 | 3 |
| Code 2 | 0 | 1 | 0 | R | s | L | | | | | | | | | | | | | | | | | | | | | | | | 0,1 | 2,3 | 6 |
| Code 3 | 0 | 1 | 1 | R | R | s | L | L | | | | | | | | | | | | | | | | | | | | | | 2,3,4,5 | 1,2,3,4 | 8 |
| Code 4 | 0 | 0 | 1 | 0 | R | R | s | L | | | | | | | | | | | | | | | | | | | | | | 0,1 | 4,5,6,7 | 8 |
| Code 5 | 0 | 0 | 1 | 1 | R | R | R | L | L | | | | | | | | | | | | | | | | | | | | | 6,7,8,9 | 1,2,3,4 | 9 |
| Code 6 | 0 | 0 | 0 | 1 | 0 | R | R | R | R | R | R | s | | | | | | | | | | | | | | | | | | 10-73 | 1 | 12 |
| Code 7 | 0 | 0 | 0 | 1 | 1 | 1 | L | L | L | L | L | L | L | L | L | L | | | | | | | | | | | | | | 0-31 | 0-31 | 16 |
| Code 8 | 0 | 0 | 0 | 0 | 0 | 1 | L | L | L | L | L | L | L | L | L | L | L | L | | | | | | | | | | | | 0 | 0-4095 | 18 |
| Code 9 | 0 | 0 | 0 | 0 | 0 | 0 | | | | | | | | | | | | | | | | | | | | | | | | EOB | 0 | 6 |
| Code 10 | 0 | 0 | 0 | 0 | 0 | 0 | 1 | R | R | R | R | R | R | R | R | s | L | L | L | L | L | L | L | L | L | L | L | L | | 0-255 | 0-4095 | 28 | case 0 ··· Code 1
case 1 ··· Code 2, Code 3
case 2 ··· Code 4, Code 5
case 3 ··· Code 6, Code 7
case 4 ··· Code 8
case 5 ··· Code 9
case 6 ··· Code 10

FIG. 20

```
clz = FirstSetBit_Hi_MSB(code);
switch(clz){
case 0:
            run=BITAT(code,1,1);
            level=1;
            sign=BITAT(code,2,1);
            codedbits = 3;
            break;
case 1:
    if(BITAT(code,2,1)==0){
            run=BITAT(code,3,1);
            level=BITAT(code,5,1)+2;
            sign=BITAT(code,4,1);
            codedbits = 6;
    }else{
            run=BITAT(code,4,2)+2;
            level=BITAT(code,7,2)+1;
            sign=BITAT(code,5,1);
            codedbits = 8;
    }
    break;
case 2:
    if(BITAT(code,3,1)==0){
            run=BITAT(code,4,1);
            level=BITAT(code,7,2)+4;
            sign=BITAT(code,5,1);
            codedbits = 8;
    }else{
            run=BITAT(code,5,2)+6;
            level=BITAT(code,8,2)+1;
            sign=BITAT(code,6,1);
            codedbits = 9;
    }
    break;
case 3:
    if(BITAT(code,4,1)==0){
            run=BITAT(code,10,6)+10;
            level=1;
            sign=BITAT(code,11,1);
            codedbits = 12;
    }else{
            run=BITAT(code,9,5);
            level=BITAT(code,15,5);
            sign=BITAT(code,10,1);
            codedbits = 16;
    }
    break;
case 4:
    run=0;
    level=BITAT(code,17,12);
    sign=BITAT(code,5,1);
    codedbits = 18;
    break;
case 5:
    run=256-numinblock-1;
    level=0;
    sign=0;
    codedbits = 6;
    break;
case 6:
    run=BITAT(code,14,8);
    level=BITAT(code,27,12);
    sign=BITAT(code,15,1);
    codedbits = 28;
    break;
default:
}
```

FIG. 21

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | Run | Level | BIT LENGTH | NUMBER OF APPEARANCES |
|---|---|---|---|---|---|---|---|---|---|---|---|---|---|---|---|---|---|---|---|---|---|---|---|---|---|---|---|---|---|---|---|---|---|---|
| 1 | 0 | s | | | | | | | | | | | | | | | | | | | | | | | | | | | | | 0 | 1 | 3 | 2,848,872 |
| 1 | 1 | s | | | | | | | | | | | | | | | | | | | | | | | | | | | | | 1 | 1 | 3 | 1,024,095 |
| 0 | 1 | 0 | R | s | I | | | | | | | | | | | | | | | | | | | | | | | | | | 0,1 | 2,3 | 6 | 1,738,717 |
| 0 | 1 | 1 | R | R | s | I | I | | | | | | | | | | | | | | | | | | | | | | | | 2,3,4,5 | 1,2,3,4 | 8 | 113,747 |
| 0 | 0 | 1 | 0 | R | s | s | I | | | | | | | | | | | | | | | | | | | | | | | | 0,1 | 4,5,6,7 | 8 | 1,529,268 |
| 0 | 1 | 1 | 1 | R | R | R | R | I | | | | | | | | | | | | | | | | | | | | | | | 6,7,8,9 | 1,2,3,4 | 9 | 197,638 |
| 0 | 0 | 0 | 1 | R | R | R | R | R | R | R | s | | | | | | | | | | | | | | | | | | | | 10–73 | 1 | 12 | 260,545 |
| 0 | 0 | 0 | 0 | 1 | R | R | R | R | R | R | I | I | I | I | I | I | | | | | | | | | | | | | | | 0–31 | 0–31 | 16 | 345,796 |
| 0 | 0 | 0 | 0 | 0 | s | R | R | R | R | R | I | I | I | I | I | I | I | | | | | | | | | | | | | | 0 | 0–4095 | 18 | 28,320 |
| 0 | 0 | 0 | 0 | 1 | 1 | 1 | | | | | | | | | | | | | | | | | | | | | | | | | EOB | 0 | 6 | 257,909 |
| 0 | 0 | 0 | 0 | 0 | 0 | 1 | 1 | | | | | | | | | | | | | | | | | | | | | | | | 0 | 0 | 7 | 372 |
| 0 | 0 | 0 | 0 | 0 | 0 | 0 | 1 | R | R | R | R | R | R | R | R | s | I | I | I | I | I | I | I | I | I | I | I | I | | | 0–255 | 0–4095 | 29 | 1,971 |

IMAGE DECODER, GRAPHICS PROCESSING SYSTEM, IMAGE DECODING METHOD, AND GRAPHICS PROCESSING METHOD

BACKGROUND

The present disclosure relates to an image decoding technology and, more particularly, to a graphics processing technology for decompressing a compressed texture.

High quality graphics is finding wider use in personal computers and game consoles. Examples of use include executing applications such as games and simulations based on high quality three-dimensional (3D) computer graphics and playing video content that combines live action film and computer graphics.

In general, graphics processing is accomplished as a result of coordination between a central processing unit (CPU) and a graphics processing unit (GPU). The CPU is a general-purpose processor adapted to handle general-purpose operations. In contrast, the GPU is a dedicated processor adapted to handle sophisticated graphics operations. The CPU performs geometric operations such as projection transformation based on a 3D model of an object. On the other hand, the GPU receives vertex and other data from the CPU to proceed with rendering. The GPU includes dedicated hardware including a rasterizer and a pixel shader to handle graphics processing through pipelining. Programmable shaders, as some of recent GPUs are called, offer programmable shading functionality and are generally supplied with a graphics library to support shader programming.

SUMMARY

In graphics processing, texture mapping is conducted which attaches textures to the surface of an object to represent the feel of the object's surface. With increasingly high definition images used for applications such as games, high resolution data is used as textures, thus resulting in large size texture data. For example, textures used for games are of the order of GiB (gibibytes) in size, making it difficult to store all necessary texture data in a memory.

For this reason, uncompressed textures or lowly compressed textures that can be directly handled by the GPU are stored in advance in a storage device such as harddisk so that textures can be loaded into a texture buffer in the memory as necessary for drawing. It normally takes several tens of milliseconds, and sometimes, as much as several seconds, to load textures from the harddisk, thus making the operation unstable. Therefore, it is difficult to use desired textures if these textures are not loaded from the harddisk in time.

On the other hand, highly compressed textures can be retained in the main memory even if such textures exceed the capacity of the main memory, making it possible to handle textures without loading from the harddisk. In this case, however, highly compressed textures are generally not handled directly by the GPU. Therefore, dedicated hardware is necessary to decompress highly compressed textures in realtime. If dedicated hardware is not available, a compressed texture is decompressed by the CPU and unarchived into the texture buffer. In this case, however, it takes time to decompress the compressed texture, and it is difficult to draw the texture in realtime.

In light of the foregoing, it is desirable to provide a graphics processing technology that allows decompression of a compressed texture with high efficiency.

According to an embodiment of the present disclosure, there is provided a graphics processing system which includes a main memory, and a graphics processing unit. The graphics processing unit includes: a run length decoding section adapted to run-length-decode a compressed texture; and a reciprocal spatial frequency conversion section adapted to restore the texture by performing reciprocal spatial frequency conversion on the run-length-decoded texture. The main memory includes a texture pool adapted to partially cache the restored texture.

According to another embodiment of the present disclosure, there is provided a graphics processing method of a graphics processing system which includes a main memory and a graphics processing unit. The graphics processing method, by the graphics processing unit, includes: run length decoding a compressed texture with a compute shader; restoring the texture by performing reciprocal spatial frequency conversion on the run-length-decoded texture; and storing the restored texture in a texture pool of the main memory adapted to partially cache a texture.

According to still another embodiment of the present disclosure, there is provided an image decoder which includes: a variable length decoding section adapted to variable-length-decode a compressed image based on an encoding table which assigns a code together with an immediate value field, the code being associated with a pair of a run range and a level range, and the immediate value field indicating at least one of an immediate value of the run and an immediate value of the level; and a reciprocal spatial frequency conversion section adapted to restore the image by performing reciprocal spatial frequency conversion on the variable-length-decoded image.

According to still another embodiment of the present disclosure, there is provided a graphics processing system which includes: a main memory; and a graphics processing unit. The graphics processing unit includes: a variable length decoding section adapted to variable-length-decode a compressed texture based on an encoding table which assigns a code together with an immediate value field, the code being associated with a pair of a run range and a level range, and the immediate value field indicating at least one of an immediate value of the run and an immediate value of the level; and a reciprocal spatial frequency conversion section adapted to restore the texture by performing reciprocal spatial frequency conversion on the variable-length-decoded texture. The main memory includes a texture pool adapted to partially cache the restored texture.

According to still another embodiment of the present disclosure, there is provided an image decoding method. The image decoding method includes: variable length decoding a compressed image based on an encoding table which assigns a code together with an immediate value field, the code being associated with a pair of a run range and a level range, and the immediate value field indicating at least one of an immediate value of the run and an immediate value of the level; and restoring the image by performing reciprocal spatial frequency conversion on the variable-length-decoded image.

According to still another embodiment of the present disclosure, there is provided a graphics processing method of a graphics processing system which includes a main memory and a graphics processing unit. The graphics processing method, by the graphics processing unit, includes: variable length decoding a compressed texture with a compute shader based on an encoding table which assigns a code together with an immediate value field, the code being associated with a pair of a run range and a level range, and the immediate value field indicating at least one of an immediate value of the run and an immediate value of the level; restoring the texture by performing reciprocal spatial frequency conversion on the variable-length-decoded texture; and storing the restored texture in a texture pool of the main memory adapted to partially cache a texture.

It should be noted that any combinations of the above components and any conversions of expressions of the present disclosure between "method," "device," "system," "computer program," "data structure," "recording medium," and so on are also effective as modes of the present disclosure.

The present disclosure allows decompression of an encoded image, more particularly, of a compressed texture with high efficiency.

BRIEF DESCRIPTION OF THE DRAWINGS

FIGS. 2A to 2C are diagrams describing a mipmap texture;

FIGS. 4A to 4E are diagrams describing the size of run-length-encoded texture data;

FIG. 6 is a flowchart describing the flow of run length decoding according to the present embodiment;

FIG. 7 is a diagram describing the process of executing threads for comparison when there is no imbalance between branch destinations;

FIG. 8 is a diagram describing the process of executing threads if there is an imbalance between branch destinations;

FIGS. 10A to 10F are diagrams describing the size of Zlib compressed texture data;

FIGS. 11A and 11B are diagrams describing an advantage of run-length-encoding a texture in the present embodiment;

FIG. 14 is a diagram illustrating an example of an encoding table with immediate value fields shown in FIG. 13;

FIG. 15 is a diagram illustrating another example of an encoding table with immediate value fields shown in FIG. 13;

FIG. 16 is a diagram illustrating still another example of an encoding table with immediate value fields shown in FIG. 13;

FIG. 19 is a diagram describing a branch taking place when a search is made to find out to which row of the encoding table with immediate value fields shown in FIG. 16 encoded data applies;

FIG. 20 is a diagram illustrating a program code having the branch described in FIG. 19; and FIG. 21 is a diagram illustrating a working example of the encoding table with immediate value fields shown in FIG. 13.

DETAILED DESCRIPTION OF THE PREFERRED EMBODIMENTS

First Embodiment

Figure 1:
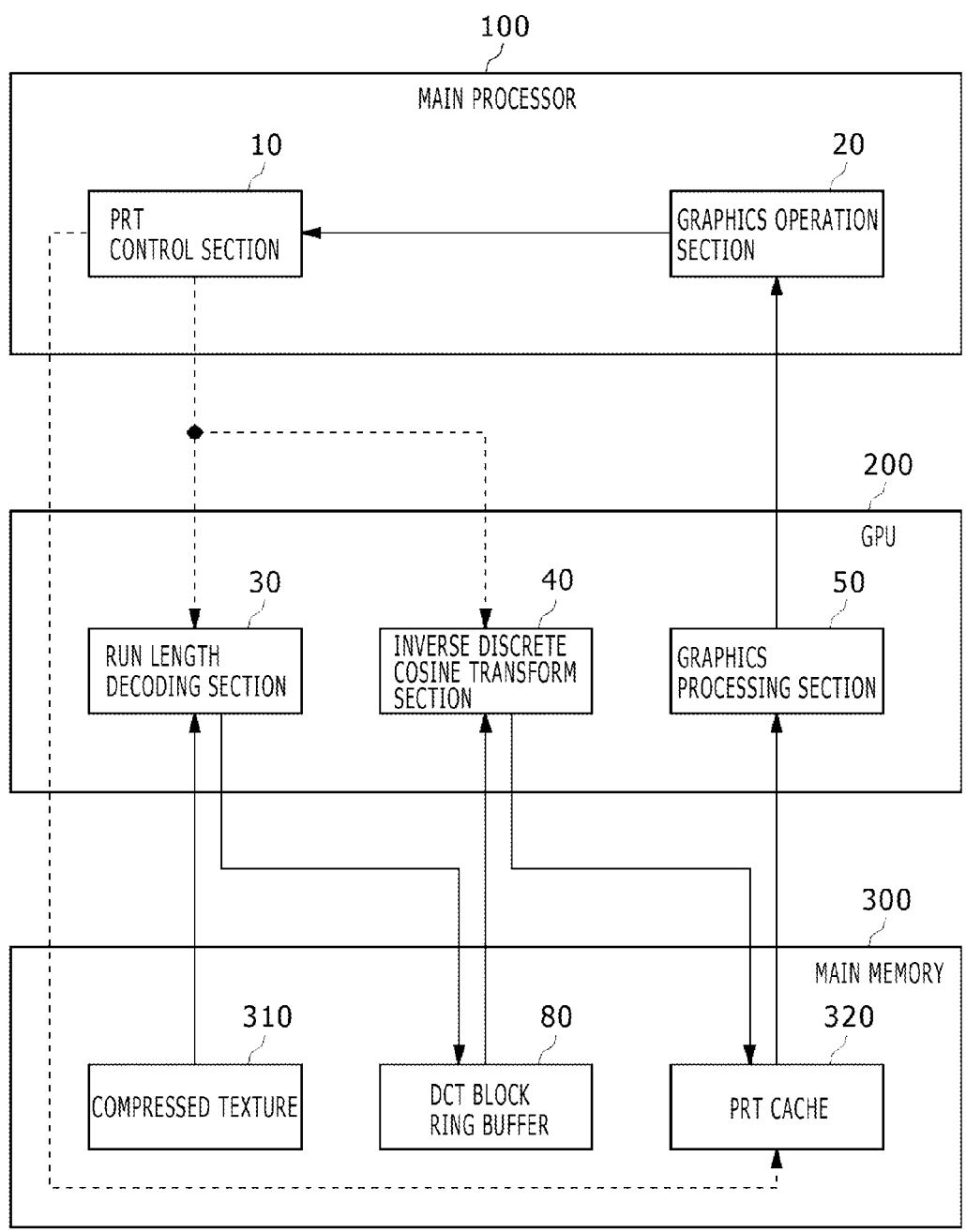
FIG. 1 is a configuration diagram of a graphics processing system according to an embodiment of the present disclosure.

FIG. 1 is a configuration diagram of a graphics processing system according to a first embodiment. The graphics processing system includes a main processor 100, a graphics processing unit (GPU) 200, and a main memory 300.

The main processor 100 may be a single main processor, or a multiprocessor system that includes a plurality of processors, or a multicore processor that has a plurality of processor cores integrated in a single package. The main processor 100 can write and read data to and from the main memory 300 via a bus.

The GPU 200 is a graphics chip that contains a graphics processing system core and can write and read data to and from the main memory 300 via a bus.

The main processor 100 and the GPU 200 are connected by a bus and can exchange data with each other via the bus.

FIG. 1 illustrates, in particular, the configuration relating to texture processing of all graphics processing tasks, with the configuration for other processing tasks not shown.

The memory area of the main memory 300 is mapped onto the address space referenced by the GPU 200 to permit access from the GPU 200. The GPU 200 can read texture data from the main memory 300. Texture data is partially cached into the main memory 300 by using a technique called PRT.

The main processor 100 includes a graphics operation section 20 and a PRT control section 10. The graphics operation section 20 receives an LOD (level of detail) value from a graphics processing section 50 of the GPU 200 and hands the LOD value over to the PRT control section 10. The LOD value indicates the level of detail of the texture. The PRT control section 10 calculates, based on the LOD value received from the graphics processing section 50, a mipmap texture which will probably be necessary in the future, instructing that the mipmap texture be unarchived into a PRT cache 320, a texture pool, and updating the PRT mapping by removing pages that are no longer used.

FIGS. 2A to 2C are diagrams describing a mipmap texture. A mipmap texture is a plurality of textures having different resolutions in accordance with the level of detail (LOD). A mipmap texture 340 shown in FIG. 2A is a high-resolution texture. A mipmap texture 342 shown in FIG. 2B is a medium-resolution texture having half the vertical size and half the horizontal size of the mipmap texture 340. A mipmap texture 344 shown in FIG. 2C is a low-resolution texture having half the vertical size and half the horizontal size of the mipmap texture 342.

Referring back to FIG. 1, the PRT control section 10 instructs the GPU 200 to read the mipmap texture whose level of detail has been specified by the graphics operation section 20. More specifically, the PRT control section 10 controls a run length decoding section 30 and an inverse discrete cosine transform (IDCT) section 40 of the GPU 200.

Further, the PRT control section 10 controls swap-in and swap-out of the PRT cache 320 stored in the main memory 300.

The GPU 200 includes the run length decoding section 30, the IDCT section 40, and the graphics processing section 50.

The run length decoding section 30 reads, from the main memory 300, a compressed texture 310 that matches the level of detail specified by the PRT control section 10, run-length-decoding the compressed texture 310 and storing the resultant texture in a discrete cosine transform (DCT) block ring buffer 80.

The IDCT section 40 inverse-discrete-cosine-transforms the DCT block of the run-length-decoded texture stored in the DCT block ring buffer 80, storing the resultant block in the PRT cache 320.

The graphics processing section 50 reads the necessary mipmap texture from the PRT cache 320. The PRT cache 320 is a texture tile pool adapted to partially cache textures, swapping in necessary textures and swapping out unnecessary ones.

Figure 3:
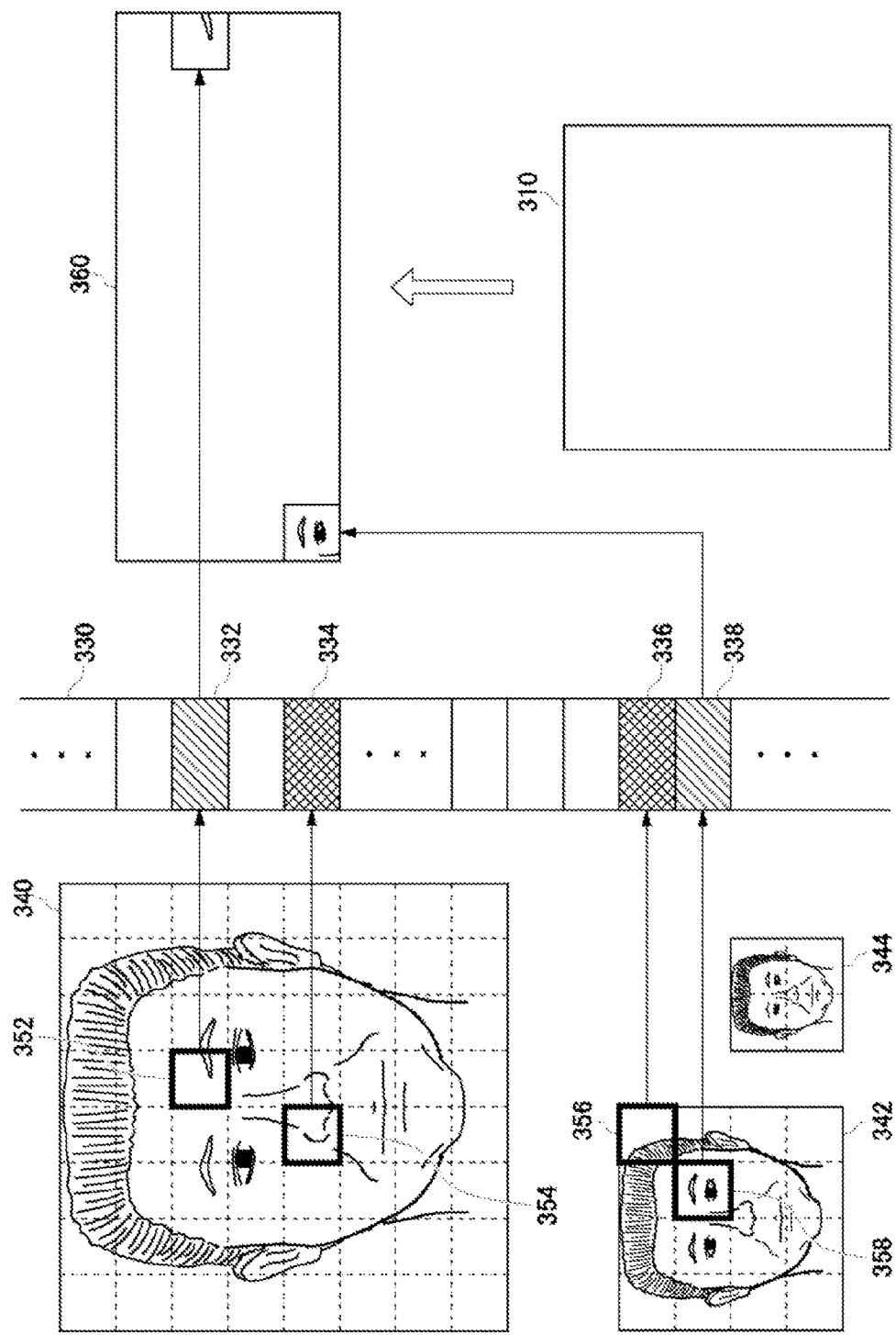
FIG. 3 is a diagram describing how partially resident textures (PRT) according to the present embodiment works.

FIG. 3 is a diagram describing how PRT according to the present embodiment works.

Areas for the mipmap textures 340, 342, and 344 are arranged in the virtual memory. The texture area is divided into chunks each having a given size. Only necessary texture areas are stored in a texture tile pool 360 using a page table 330. Here, textures are available in the form of the compressed textures 310 in the main memory 300. Therefore, when texture areas are cached into the texture tile pool 360, it is necessary to decompress the compressed textures 310. The PRT control section 10 controls the run length decoding section 30 and the IDCT section 40 in response to a request from the graphics processing section 50, decompressing the compressed textures 310 as necessary.

In the example shown in FIG. 3, a chunk 352 of the high-resolution mipmap texture 340 and a chunk 358 of the medium-resolution mipmap texture 342 are associated with pages 332 and 338 of the page table 330, respectively, and physical memory is mapped from the texture tile pool 360.

On the other hand, a chunk 354 of the high-resolution mipmap texture 340 and a chunk 356 of the medium-resolution mipmap texture 342 are associated with pages 334 and 336 of the page table 330, respectively. However, physical memory has yet to be mapped to these chunks from the texture tile pool 360. In this case, the PRT control section 10 exercises control based on the LOD value received from the graphics processing section 50 so that necessary textures are available in the texture tile pool 360 as described earlier. As a result, physical memory of the texture tile pool 360 is assigned, and necessary texture data is decompressed from the compressed texture 310 and stored in the texture tile pool 360. On the other hand, the graphics processing section 50 reads a mipmap texture from the texture tile pool 360 using a LOD value calculated by itself and without the mediation of the main processor 100. At this time, if no mipmap texture is available in the texture tile pool 360 which matches the calculated LOD value, the graphics processing section 50 falls back, reducing the level of detail required, reading a low-resolution mipmap texture from the texture tile pool 360, and performing drawing.

FIGS. 4A to 4E are diagrams describing the size of run-length-encoded texture data. As illustrated in FIG. 4A, we assume that original texture data is in RGB 32-bit format and, for example, 16 MiB (mebibytes) in size. FIG. 4B illustrates a texture compressed by a texture compression technique called BC5 or BC7. These techniques offer an approximately 1/4 compression ratio relative to the original texture data, providing data size reduction down to 4 MiB while at the same time maintaining a comparatively high data quality. If a comparatively low data quality is allowed, a texture compressed by a texture compression technique called BC1 or DXT1 may be used as illustrated in FIG. 4C. In this case, these techniques offer an approximately 1/8 compression ratio relative to the original texture data, providing data size reduction down to 2 MiB. All the texture formats shown in FIGS. 4A to 4C can be directly handled by the GPU 200.

On the other hand, a JPEG-compressed texture as illustrated in FIG. 4D offers an approximately 1/20 compression ratio relative to the original texture data, providing data size reduction down to 0.5 to 1 MiB although it is difficult for the GPU 200 to directly handle the texture. In this case, it is inefficient for the compute shader of the GPU 200 to perform a complicated algorithm such as JPEG decompression. It is difficult to decompress a compressed texture in realtime for graphics processing unless dedicated hardware capable of JPEG decompression is available.

In contrast, DCT and run length encoding offers an approximately 1/10 compression ratio as illustrated in FIG. 4E, providing data size reduction down to 1 to 2 MiB. Data compression at such a high ratio allows the compressed texture 310 to be resident in the main memory 300. The GPU 200 can read the compressed texture 310 from the main memory 300 and perform run-length decoding and inverse discrete cosine transform (IDCT) in realtime by the compute shader so as to restore the texture.

It is difficult for the GPU 200 to directly use a JPEG-compressed texture. Therefore, it is necessary to decode the texture with a JPEG decoder once. A graphics device having a JPEG codec can handle a JPEG-compressed texture. In general, however, a JPEG codec is not readily available. JPEG compression consists of discrete cosine transform, quantization, and Huffman encoding of an image. Huffman encoding is a complicated compression algorithm. Therefore, if the compute shader of the GPU 200 Huffman-decodes a JPEG-compressed texture, the amount of calculations will be enormous.

In contrast, simple calculations as done with run length decoding can be efficiently performed by the compute shader of the GPU 200. A description will be given of the fact that run length decoding can be performed efficiently by the compute shader of the GPU 200 with reference to FIGS. 5A to 8.

Figure 5A:
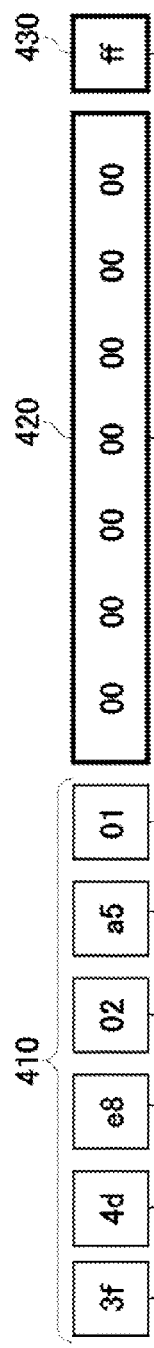
FIGS. 5A to 5C are diagrams describing run-length encoding and decoding according to the present embodiment.
Figure 5B:
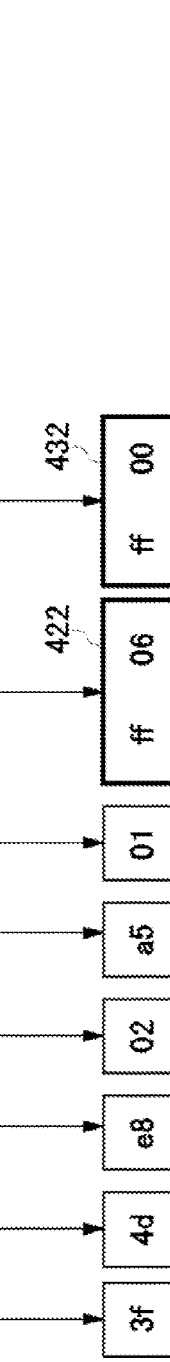
Figure 5C:
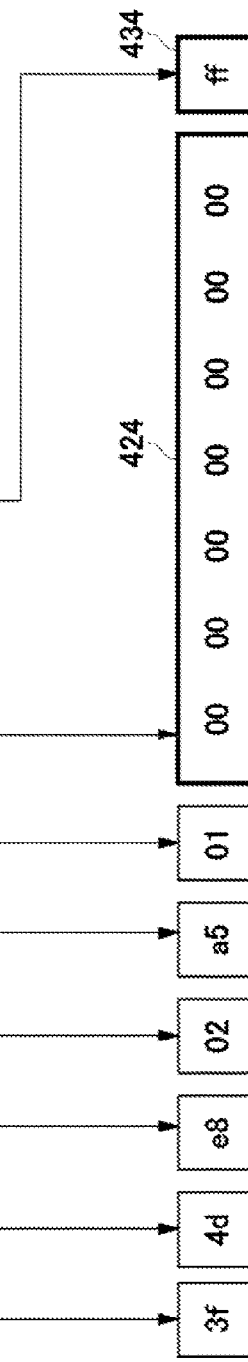

FIGS. 5A to 5C are diagrams describing run-length encoding and decoding according to the present embodiment. FIG. 5A illustrates an original data string. FIG. 5B illustrates a run-length-encoded data string. FIG. 5C illustrates a run-length-decoded data string.

The run length encoding according to the present embodiment is performed on a byte-by-byte basis. An input value other than hexadecimal "00" or "ff" is output in an as-is manner. None of "3f," "4d," "e8," "02," "a5," and "01" of the first six-byte input value shown by a code 410 in FIG. 5A is either "00" or "ff." Therefore, this value is encoded as a six-byte output value of "3f," "4d," "e8," "02," "a5," and "01."

An input value of 'n' consecutive "00s" are encoded as a two-byte output value of "ff" and "n−1" in run length encoding according to the present embodiment. For example, if there are seven consecutive "00s" in a code 420 shown in FIG. 5A, these "00s" are encoded as a two-byte output value "ff06" as shown by a code 422 in FIG. 5B.

In run length encoding according to the present embodiment, if an actual value of "ff" is input, this value is converted to a two-byte value of "ff00" to identify that it is an actual value of "ff." The input value of "ff" shown by a code 430 in FIG. 5A is encoded as a two-byte output value of "ff00" as shown by a code 432 in FIG. 5B.

In run length decoding according to the present embodiment, it is only necessary to perform the opposite of run length encoding. "3f," "4d," "e8," "02," "a5," and "01" of the first six-byte input value in FIG. 5B are output in an as-is manner as illustrated in FIG. 5C. As for "ff06" shown by the code 422 in FIG. 5B, the first "ff" is converted to "00" first, and then six "00s" are output as shown by a code 424 in FIG. 5C. "ff00" shown by the code 432 in FIG. 5B indicates that it is an actual value of "ff." Therefore, one byte "ff" is output as shown by a code 434 in FIG. 5C.

FIG. 6 is a flowchart describing the flow of run length decoding according to the present embodiment.

A variable RL indicates a number of times (n−1) "00" is repeatedly output. The initial value of RL is equal to 0 (No in S10). Therefore, one byte is read from the input data string (S20). If the data read in step S20 is not "ff" (Yes in S22), the read data is output in an as-is manner (S24), and control returns to step S10. When the data read in step S20 is "ff" (No in S22), the next one byte is read (S30).

When the data read in step S30 is "00" (Yes in S32), this means that "ff" read immediately previously is an actual value. Therefore, "ff" is output (S34), and control returns to step S10.

If the data read in step S30 is not "00" (No in S32), the read data is substituted into the variable RL (S40). As a result, the number of times (n−1) "00" is repeatedly output is substituted into the variable RL. Then, the first "00" is output (S42), and control returns to step S10.

When control returns from step S24 or S34 to step S10, the variable RL is equal to 0 (No in step S10). Therefore, control proceeds to step S20 to repeat the succeeding steps.

When control returns from step S42 to step S10, the variable RL is equal to n−1 (Yes in step S10). Therefore, "1" is subtracted from the variable RL (S12), and "00" is output (S14), and control returns to step S10. Steps 12 and 14 are repeated until the variable RL becomes "0," and "00" is output (n−1) times.

In texture compression according to the present embodiment, an image block is subjected to discrete cosine transform (DCT) first, followed by quantization and run length encoding. When a natural image is subjected to discrete cosine transform, most of frequency components are concentrated in the low frequency range, and high frequency components are negligibly small. In particular, the DCT coefficients of the high frequency components are almost zero because of quantization. Hence, input data of run length encoding often contains a number of consecutive zeros.

Assuming that steps S10, S12, and S14 are classified as branch A, steps S20, S22, and S24 as branch B, steps S30, S32, and S34 as branch C, and steps S40 and S42 as branch D, discrete-cosine-transformed texture data often contains a number of consecutive zeros. Therefore, such texture data extremely frequently passes through branch A during run length decoding. It has been experimentally verified that roughly 80 percent or more of common natural image textures passes through branch A. Thanks to this characteristic of run length decoding, the compute shader of the GPU 200 can perform run length decoding with high efficiency. The reason for this is that the GPU 200 has an SIMD (Single Instruction Multiple Data) architecture. As a result, a plurality of threads execute the same instruction for different pieces of data at the same time. Therefore, an imbalance between branch conditions contributes to higher concurrency, thus providing improved execution efficiency.

With the GPU 200, a single program counter (PC) references an instruction stored in an instruction cache, and 16 ALUs (Arithmetic Logic Units), for example, execute the instruction referenced by the PC at the same time. For each branch in an "if-then-else" loop, a different instruction is set in 16 threads and executed at the same time. In an if branch, those threads in charge of the pixels for which the if condition is true (True) of all the 16 threads are enabled and executed in parallel. In an else branch, those threads in charge of the pixels for which the else condition is true (False) of all the 16 threads are enabled and executed in parallel. When the number of cases in which the if condition is true and that in which the else condition is true are roughly the same, the threads to be enabled in the true and false cases are changed frequently. However, if there is an imbalance such as if the if condition is true in 80 percent of all the cases, and the else condition is true in 20 percent thereof, the set of threads to be enabled for the true case can be repeatedly used, thus contributing to improved execution efficiency. This point will be described in detail with reference to FIGS. 7 and 8.

FIG. 7 is a diagram describing the process of executing threads for comparison when there is no imbalance between branch destinations.

The GPU 200 includes a plurality of computing units. The number of threads executed simultaneously by each of the computing units of the GPU 200 is determined by the number of arithmetic units in the computing unit. We assume that there are 16 arithmetic units. The group of up to 16 threads that can be simultaneously loaded into a single computing unit will be referred to as a "thread set." Each of the threads included in a thread set executes the same shader program. However, data to be processed is different from one thread to another. If there is a branch in the program, the threads may have different branch destinations. A single computing unit executes a single thread set (up to 16 threads here) in parallel in a given cycle.

For example, even if the number of necessary instructions in each branch destination is a few, instructions in each branch are executed one after another by changing the threads to be executed with a thread mask because of the SIMD structure in which there is one program counter and all the arithmetic units in each of the computing units execute the same instruction.

As an example, we assume that branch A is executed by three instructions, branch B by four instructions, branch C by two instructions, and branch D by five instructions in the flowchart of FIG. 6. In the example shown in FIG. 7, a case will be described in which the branch destinations of the 16 threads in a thread set 450 are sequentially "A," "A," "C," "A," "A," "A," "C," "B," "C," "A," "C," "A," "C," "A," "C," and "D."

In cycle 1, only the threads which will execute branch A (eight threads in this case) are enabled. Three instructions in branch A, i.e., instructions A-1, A-2, and A-3, are executed while incrementing the program counter one at a time.

In cycle 4, only the thread which will execute branch B (one thread in this case) is enabled. Four instructions in branch B, i.e., instructions B-1, B-2, B-3, and B-4, are executed while incrementing the program counter one at a time.

In cycle 8, only the threads which will execute branch C (six threads in this case) are enabled. Two instructions in branch C, i.e., instructions C-1 and C-2, are executed while incrementing the program counter one at a time.

In cycle 10, only the thread which will execute branch D (one thread in this case) is enabled. Five instructions in branch D, i.e., instructions D-1, D-2, D-3, D-4, and D-5, are executed while incrementing the program counter one at a time.

As described above, in the example shown in FIG. 7, 14 cycles are necessary for the 16 threads in the thread set to execute all the instructions of the four branches A to D.

FIG. 8 is a diagram describing the process of executing threads if there is an imbalance between branch destinations. In the example shown in FIG. 8, a case will be described in which the branch destinations of the 16 threads in a thread set 452 are sequentially "A," "A," "C," "A," "A," "A," "C," "C," "C," "A," "C," "A," "C," "A," "C," and "A." In this example, four branch destinations are available in the shader program. However, there is an imbalance between the pixels for which the branch conditions are true. As a result, only two branch destinations, branches A and C, are available. It is only necessary for the 16 threads in the thread set to execute only these two branches.

In cycle 1, only the threads which will execute branch A (nine threads in this case) are enabled. Three instructions in branch A, i.e., instructions A-1, A-2, and A-3, are executed while incrementing the program counter one at a time.

In cycle 4, only the threads which will execute branch C (seven threads in this case) are enabled. Two instructions in branch C, i.e., instructions C-1 and C-2, are executed while incrementing the program counter one at a time.

As described above, in the example shown in FIG. 8, it is only necessary for the 16 threads in the thread set to execute all the instructions of the two branches, i.e., branches A and C. As a result, the number of necessary cycles has reduced to five cycles.

As described above, if there is an imbalance between program branch destinations due to the characteristic of input data, it is possible to execute instructions repeatedly using the same thread mask without changing it, thus contributing to improved execution efficiency. A variation between branch destinations makes it necessary to change the thread mask for each branch, thus resulting in lower execution efficiency.

The advantage of run length encoding following discrete cosine transform of a texture lies in this. Because of the characteristic of the DCT coefficients derived from a natural image, values other than "0" are concentrated in the low frequency components at the top left of the DCT coefficient matrix, with "0s" being consecutive in the high frequency components at the bottom right of the matrix. Therefore, if discrete-cosine-transformed image blocks are converted into a one-dimensional array in a zigzag fashion, the DCT coefficients of all the blocks tend to be data strings that include consecutive non-zero values at first and consecutive zeros later.

In consideration of this tendency of the DCT coefficients, run-length-encoded data is assigned to threads of a thread set so that these threads handle the DCT coefficients of different DCT blocks, and the thread set is configured so that the threads proceed with run length decoding of the DCT coefficients at the relatively identical positions in the DCT blocks. One of branches A to D is selected as a branch destination depending on which of "00," "ff," and any other the DCT coefficient is. Because the DCT coefficients have a similar tendency at the relatively identical positions in the DCT blocks according to the configuration of the thread set, the threads in the thread set end up having the identical branch destinations. As a result, the threads have identical branch destinations as shown in FIG. 8 rather than having varied branch destinations as shown in FIG. 7. This makes it possible to maintain high efficiency in execution of the thread set for a long time, thus contributing to highly efficient execution of run length decoding by the thread set.

The graphics processing system according to the present embodiment uses a run-length-encoded texture after discrete cosine transform, thus providing significant reduction in texture size. The compute shader of the GPU 200 performs run length decoding of a compressed texture followed by inverse discrete cosine transform, thus allowing for fast decompression of a compressed texture for loading into graphics processing. Highly compressed textures can be resident in a memory. This eliminates the need to read large-size textures from a storage device such as harddisk, thus allowing to execute PRT on memory. Thanks to compressed textures available on memory, even if compressed textures are read, decompressed, and swapped into the PRT cache as necessary, the latency is short, thus allowing for realtime processing of the textures.

Second Embodiment

Figure 9:
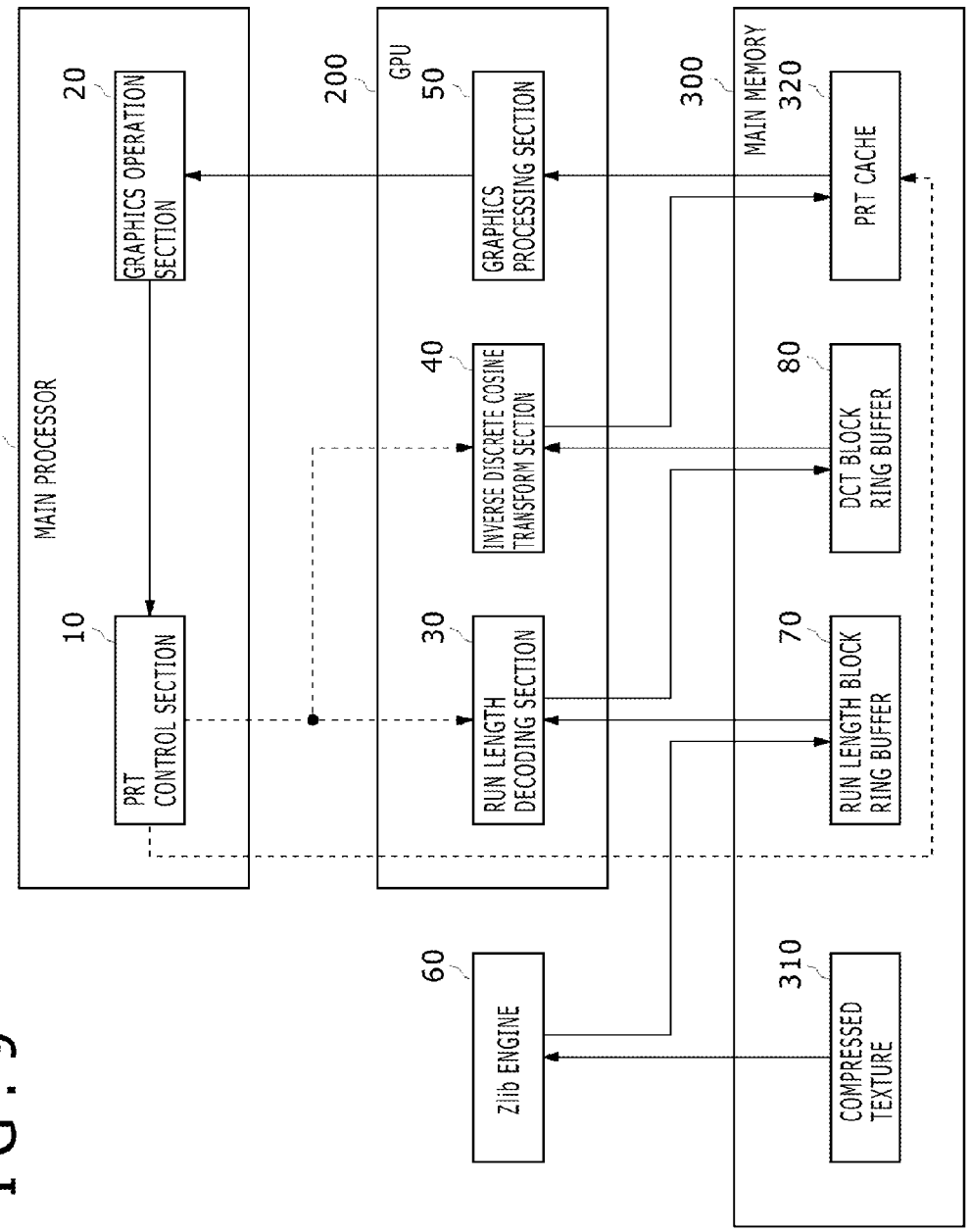
FIG. 9 is a configuration diagram of a graphics processing system according to another embodiment of the present disclosure.

FIG. 9 is a configuration diagram of a graphics processing system according to a second embodiment. The graphics processing system according to the second embodiment differs from that according to the first embodiment in that it includes a Zlib engine 60. The description of similarities with the first embodiment will be omitted as appropriate, and a detailed description will be given primarily of differences from the first embodiment.

The Zlib engine 60 is a dedicated circuit adapted to perform Zlib decompression. Zlib is a library that incorporates a lossless compression algorithm called Deflate and handles data compression and decompression.

In the present embodiment, a texture that has been discrete-cosine-transformed, followed by run length encoding and lossless compression by Zlib, is used as the compressed texture 310. The compressed texture 310 is stored in the main memory 300.

The Zlib engine 60 Zlib-decompresses the compressed texture 310 stored in the main memory 300, storing the resultant texture in a run length block ring buffer 70.

The run length decoding section 30 run-length-decodes the compressed texture stored in the run length block ring buffer 70 that has been subjected to Zlib-decompression, storing the resultant texture in the DCT block ring buffer 80. The succeeding processes are the same as in the first embodiment.

FIGS. 10A to 10F are diagrams describing the size of Zlib compressed texture data. Compressed textures shown in FIGS. 10A to 10C that can be directly handled by the GPU 200 are the same as those shown in FIG. 4A to 4C. Therefore, the description thereof is omitted.

FIGS. 10D to 10F illustrate compressed textures that are not directly handled by the GPU 200. The discrete-cosine-transformed and Zlib-compressed texture shown in FIG. 10E offers an approximately 1/20 compression ratio as does the JPEG-compressed texture shown in FIG. 10D. As will be described later, however, Zlib-compression of a DCT coefficient in an as-is manner puts the Zlib engine 60 under load in excess of its normal hardware performance during decompression, thus resulting in inefficiency. For this reason, a texture that has been Zlib-compressed following discrete cosine transform and run length encoding is used in the present embodiment as illustrated in FIG. 10F.

FIGS. 11A and 11B are diagrams describing an advantage of run-length-encoding a texture in the present embodiment.

FIG. 11A illustrates, for comparison, a case in which a texture that is not run-length-encoded is Zlib-decompressed by the Zlib engine 60. If the compression ratio of the compressed texture is 1/20, and if the Zlib engine 60 receives an input of a compressed texture at the transfer rate of 50 MB/s (megabytes/second), it is necessary to output a Zlib-decompressed texture at the transfer rate of 1333 MB/s. The Zlib-decompressed texture is inverse-discrete-cosine-transformed by the IDCT section 40, after which the restored texture is output at the transfer rate of 1000 MB/s.

The normal input/output ratio of the Zlib engine 60 is two- to four-fold. In contrast, if a texture is not run-length-encoded, an approximately 20-fold output performance is required. However, this exceeds the normal hardware limitation of the Zlib engine 60, making it unrealistic to implement such performance. If the Zlib engine 60 with normal output performance is used, it is difficult to provide required output performance. Therefore, the output of the Zlib engine 60 is a bottleneck, resulting in an extremely long time to restore the texture.

FIG. 11B illustrates a case in which a run-length-encoded texture is Zlib-decompressed by the Zlib engine 60. In this case, if the Zlib engine 60 receives an input of a compressed texture at the transfer rate of 50 MB/s (megabytes/second), it is only necessary to output a Zlib-decompressed texture at the transfer rate of 125 MB/s. The reason for this is that the Zlib-decompressed texture is then run-length-decoded by the run length decoding section 30 and can be output at the transfer rate of 1333 MB/s. The run-length-decoded texture is inverse-discrete-cosine-transformed by the IDCT section 40, after which the restored texture is output at the transfer rate of 1000 MB/s.

The run length decoding section 30 and the IDCT section 40 are both executed by the compute shader of the GPU 200. Therefore, the data transfer bandwidth is sufficiently large. Data can be transferred from the run length decoding section 30 to the IDCT section 40 at the transfer rate of 1333 MB/s. In this case, the output performance of the Zlib engine 60 need only be about two fold. Therefore, implementation can be achieved within normal hardware limits.

Figure 12:
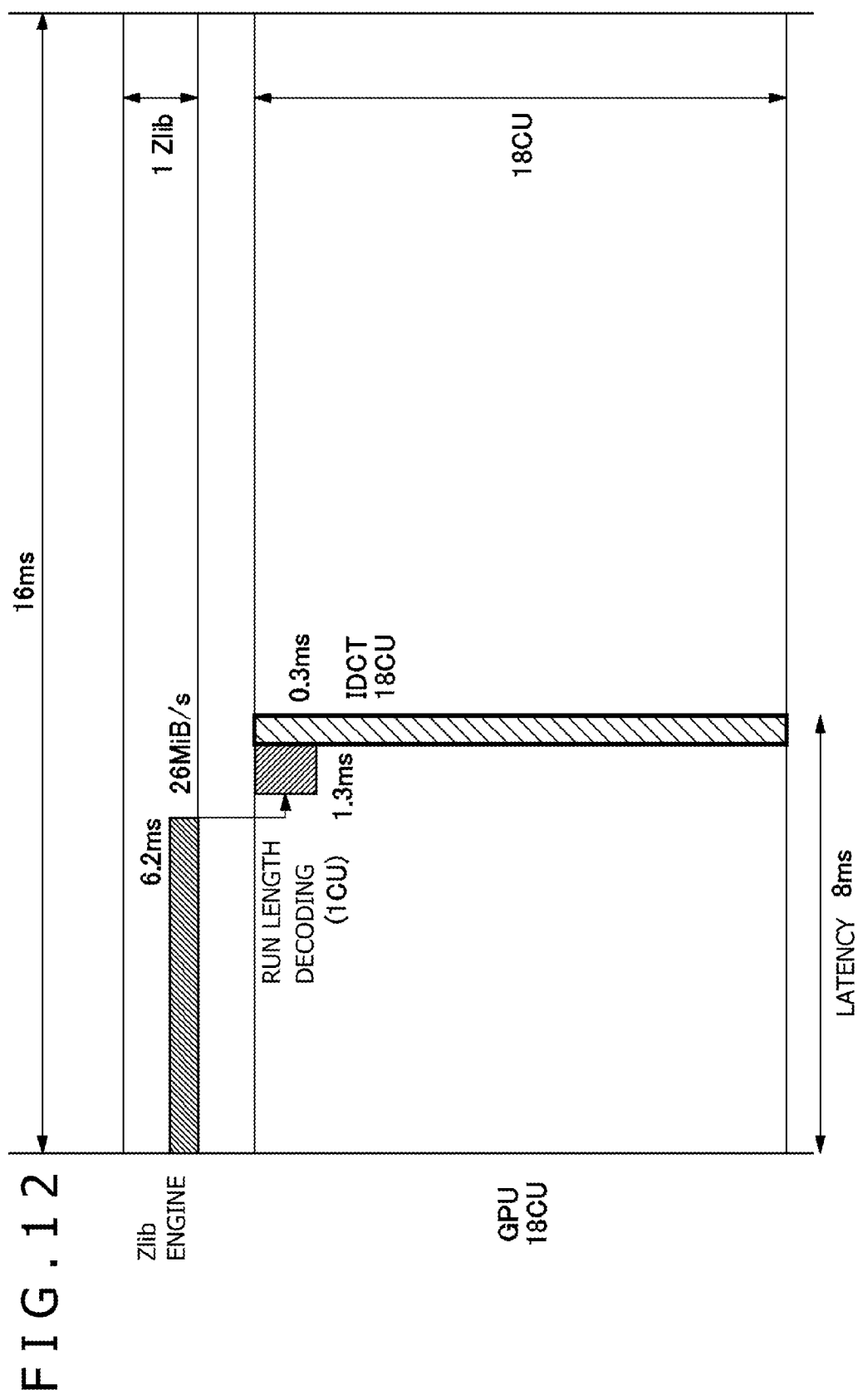
FIG. 12 is a diagram describing the decompression performance of a compressed texture by the graphics processing system according to the present embodiment.

FIG. 12 is a diagram describing the decompression performance of a compressed texture by the graphics processing system according to the present embodiment. As an example, a case will be described in which a compressed texture with 640 pixels down and 640 pixels across is decompressed. Here, the GPU 200 has 18 computing units (CUs) as an example. The Zlib engine 60 is used not only for decompression but also for other purposes. Therefore, a compressed texture is Zlib-decompressed at the rate of 26 MiB/s using part of the resource of the Zlib engine 60 having 200 MiB/s output performance. This takes 6.2 ms (milliseconds). This is followed by run length decoding by using a single CU, which takes 1.3 ms. Then, inverse discrete cosine transform is performed using the 18 CUs, which takes 0.3 ms. The total latency for decompression of a compressed texture in the main memory 300 is 8 ms, thus allowing for decompression of the compressed texture in realtime for loading into graphics processing.

If a texture that is not run-length-encoded is used, it takes the Zlib engine 60 having normal output performance 62 ms, about 10-fold the amount of time, to Zlib-decompress the compressed texture, which is not practical. Using a run-length-encoded texture reduces the load from the Zlib engine 60, and run length decoding with the compute shader at high speed provides a shorter latency caused by decompression of the compressed texture.

The graphics processing system according to the present embodiment uses a texture that has been Zlib-compressed following discrete cosine transform and run length encoding, thus providing significant reduction in texture size as does JPEG compression. As described above, a highly compressed texture can be resident in a memory, thus allowing for execution of PRT on memory.

If a graphics processing system having a Zlib decoder uses a texture that has been run-length-encoded before Zlib compression, it is possible to keep to a minimum the load on the Zlib decoder during decompression of the compressed texture.

Further, the compute shader of the GPU 200 run-length-decodes and inverse-discrete-cosine-transforms a compressed texture as in the first embodiment, thus allowing for decompression of the highly-compressed texture in realtime for loading into graphics processing.

Third Embodiment

Figure 13:
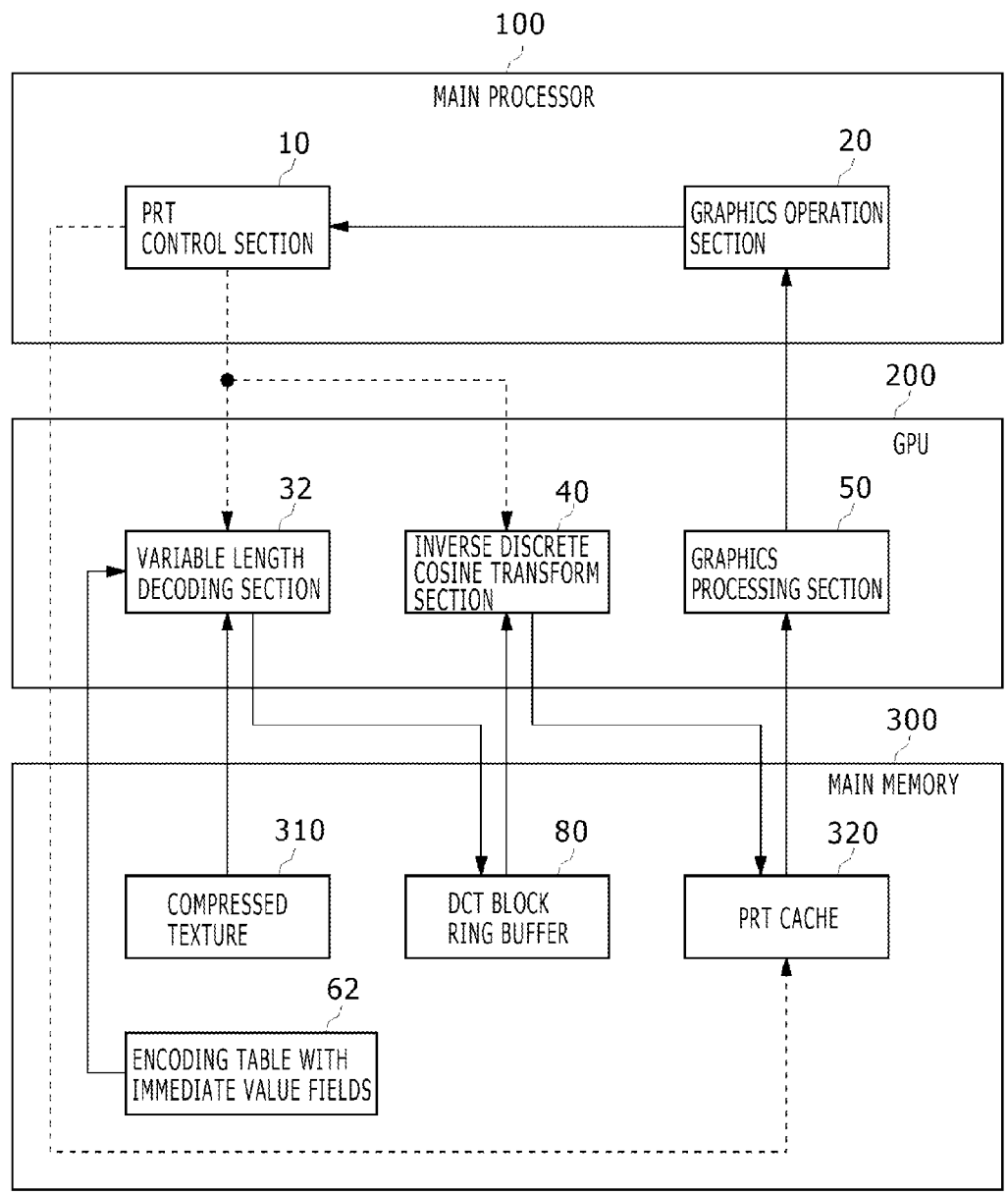
FIG. 13 is a configuration diagram of a graphics processing system according to still another embodiment of the present disclosure.

FIG. 13 is a configuration diagram of a graphics processing system according to a third embodiment of the present disclosure. The graphics processing system includes the main processor 100, the graphics processing unit (GPU) 200, and the main memory 300. Like components common to the first embodiment will be denoted by the same reference numerals, and the description thereof will be omitted as appropriate.

The PRT control section 10 instructs the GPU 200 to read the mipmap texture whose level of detail has been specified by the graphics operation section 20. More specifically, the PRT control section 10 controls a variable length decoding section 32 and the inverse discrete cosine transform (IDCT) section 40 of the GPU 200. Further, the PRT control section 10 controls swap-in and swap-out of the PRT cache 320 stored in the main memory 300.

The GPU 200 includes the variable length decoding section 32, the IDCT section 40, and the graphics processing section 50.

The variable length decoding section 32 reads, from the main memory 300, the compressed texture 310 that matches the level of detail specified by the PRT control section 10, variable length decoding the compressed texture 310 and storing the resultant texture in the DCT block ring buffer 80 by referencing an encoding table with immediate value fields 62 (hereinafter it may be referred to as the "encoding table 62" for short).

The IDCT section 40 inverse-discrete-cosine-transforms the DCT block of the variable-length-decoded texture stored in the DCT block ring buffer 80, storing the resultant block in the PRT cache 320.

The graphics processing section 50 reads the necessary mipmap texture from the PRT cache 320. The PRT cache 320 is a texture tile pool adapted to partially cache textures, swapping in necessary textures and swapping out unnecessary ones.

The PRT control section 10 controls the variable length decoding section 32 and the IDCT section 40 in response to a request from the graphics processing section 50, decompressing the compressed texture 310 as necessary.

A description will be given here of the data format of textures. The original texture data before compression is given, for example, in RGB 32-bit format. Among texture formats that can be directly handled by the GPU 200 are textures compressed by a texture compression technique called BC5 or BC7. These techniques provide data size reduction at the compression ratio of approximately 1/4 relative to the original texture data while at the same time maintaining a comparatively high data quality. If a comparatively low data quality is allowed, a texture compressed by a texture compression technique called BC1 or DXT1 may be used. In this case, these techniques provide data size reduction at the compression ratio of approximately 1/8 relative to the original texture data.

On the other hand, a JPEG-compressed texture provides data size reduction at the compression ratio of approximately 1/20 relative to the original texture data although it is difficult for the GPU 200 to directly handle the texture. In this case, it is inefficient for the compute shader of the GPU 200 to perform a complicated algorithm such as JPEG decompression. It is difficult to decompress a compressed texture in realtime for graphics processing unless dedicated hardware capable of JPEG decompression is available.

The present embodiment provides data size reduction with an approximately 1/20 compression ratio by means of DCT and variable length encoding using an encoding table with immediate value fields. When compressed to such a high extent, the compressed texture 310 can be resident in the main memory 300. The GPU 200 can restore the texture by reading the compressed texture 310 from the main memory 300 and subjecting the texture to variable length decoding using an encoding table with immediate value fields and inverse discrete cosine transform (IDCT) in realtime with the compute shader.

It is difficult for the GPU 200 to directly use a JPEG-compressed texture. Therefore, it is necessary to decode the texture with a JPEG decoder once. A graphics device having a JPEG codec can handle a JPEG-compressed texture. In general, however, a JPEG codec is not readily available. JPEG compression consists of discrete cosine transform, quantization, and Huffman encoding of an image. Huffman encoding is a complicated compression algorithm. Therefore, if the compute shader of the GPU 200 Huffman-decodes a JPEG-compressed texture, the amount of calculations will be enormous.

In contrast, variable length encoding using the encoding table with immediate value fields 62 provides a smaller encoding table thanks to the use of immediate value fields, ensuring efficient execution of variable length encoding with the compute shader of the GPU 200, which is not the case with normal Huffman encoding.

Normal Huffman encoding assigns a Huffman code to a combination of a run and a level. The run indicates the number of consecutive "0s." The level is a value other than "0." A short code is assigned to a frequently appearing combination of a run and a level, whereas a long code is assigned to an infrequently appearing combination of a run and a level, thus minimizing the average data code length.

In contrast, variable length encoding using the encoding table with immediate value fields 62 generates a code by combining a pair of a "run" and a "level" with an exponential Golomb-like "immediate value field," thus providing a smaller number of rows of an encoding table. The encoding table has at most 12 rows or so, with each of the rows of the encoding table indicating a pair of a "run range" and a "level range" that are determined for each row. The actual run and level are given by an "immediate value" that is in turn given by an immediate value field of each row. Here, a frequently appearing pair of a "run range" and a "level range" is represented by a code of short bit length, whereas an infrequently appearing pair is represented by a code of long bit length.

During variable length decoding using the encoding table with immediate value fields 62, it is only necessary to find which row of the encoding table 62 is appropriate first to identify the "run range" and "level range" pair from the appropriate row and obtain the immediate value of the run and that of the level from that row. A normal Huffman encoding table has a large number of rows, making it complicated to find the appropriate row in the table and making it difficult for the GPU 200 to handle this task. The encoding table with immediate value fields 62 has a small number of rows, making it possible to reduce the number of conditional branches. As a result, the GPU 200 can execute a plurality of threads in parallel, thus ensuring high efficiency in variable length decoding.

FIG. 14 is a diagram illustrating an example of the encoding table with immediate value fields 62. The encoding table 62 has four rows and assigns codes of different bit lengths to the pairs of a run range and a level range. Here, the DCT block is 16×16 in size, and the 12-bit DCT coefficients are encoded 256 at a time. As a result, the run takes on a value from 0 to 255, and the level takes on a value from 0 to 4095.

Code 1 or "1RRsLL" corresponds to the pair of 0 to 3 run range (2 bits) and 0 to 3 level range (2 bits) and is 6 bits in length. The first "1" is the code identifying that it is code 1. "RR" is the immediate value of the run and takes on a value from 0 to 3. "LL" is the immediate value of the level and takes on a value from 0 to 3. "s" is a sign bit to indicate the sign of the level. (The same is true for the description given below.)

Code 2 or "01RRRRRsLLLLL" corresponds to the pair of 0 to 31 run range (5 bits) and 0 to 31 level range (5 bits) and is 13 bits in length. The first "01" is the code identifying that it is code 2. "RRRRR" is the immediate value of the run and takes on a value from 0 to 31. "LLLLL" is the immediate value of the level and takes on a value from 0 to 31.

Code 3 or "001RRRRRRRRsLLLLLLLLLLLL" corresponds to the pair of 0 to 255 run range (8 bits) and 0 to 4095 level range (12 bits) and is 24 bits in length. The first "001" is the code identifying that it is code 3. "RRRRRRRR" is the immediate value of the run and takes on a value from 0 to 255. "LLLLLLLLLLLL" is the immediate value of the level and takes on a value from 0 to 4095.

Code 4 or "0001" corresponds to a code EOB (End of Block) representing the end of a block that indicates that data is all 0s from here onward and is 4 bits in length. "0001" is the code identifying that it is code 4.

As described above, each row of the encoding table with immediate value fields 62 includes a code identification code corresponding to a pair of a run range and a level range, an immediate value of the run, an immediate value of the level, and an immediate value field representing a sign bit that indicates the sign of the level.

In texture compression according to the present embodiment, an image block is subjected to discrete cosine transform (DCT) first, followed by quantization and variable length encoding. When a natural image is subjected to discrete cosine transform, most of frequency components are concentrated in the low frequency range, and high frequency components are negligibly small. In particular, the DCT coefficients of the high frequency components are almost zero because of quantization. Hence, input data of variable length encoding often contains a number of consecutive zeros.

If quantized DCT coefficients of a texture image are variable-length-encoded based on the encoding table 62 shown in FIG. 14, the number of appearances of code 1 is 7,200, that of code 2 is 810, that of code 3 is 62, and that of code 4 is 260. It has been found, as a result of multiplication of the number of appearances by the bit length of each code and summation of all the products, that the code size of the compressed texture as a whole is 56,258 bits.

FIG. 15 is a diagram illustrating another example of the encoding table with immediate value fields 62. In the encoding table 62 shown in FIG. 14, code 1 that corresponds to the pair of 0 to 3 run range and 0 to 3 level range appeared highly frequently. In the encoding table 62 shown in FIG. 15, therefore, there are five rows by adding 3-bit code 1 to the encoding table 62 with four rows shown in FIG. 14. Code 1 corresponds to the pair of 0 to 1 run range and a level of 1.

With the encoding table 62 shown in FIG. 15, encoding is performed with code 1 or "10s" (3 bits), code 2 or "01RRsLL" (7 bits), code 3 or "001RRRRRsLLLLL" (14 bits), code 4 or "0001RRRRRRRRsLLLLLLLLLLLL" (25 bits), and code 5 or "00001" (5 bits).

In the encoding table 62 shown in FIG. 14, the number of appearances of code 1 (6 bits) is 7,200, and the total bit count of code 1 is 43,200. In contrast, in the encoding table 62 shown in FIG. 15, the number of appearances is divided into two, or 3,900 for code 1 (3 bits) and 3,300 for code 2 (7 bits). The total bit count combining the counts of codes 1 and 2 has reduced to 11,700+23,100=34,800. When the encoding table 62 shown in FIG. 15 is used, the code size of the compressed texture as a whole is 48,990 bits, thus providing a reduced code size as compared to when the encoding table 62 shown in FIG. 14 is used.

FIG. 16 is a diagram illustrating still another example of the encoding table with immediate value fields 62. The encoding table 62 shown in FIG. 16 has even more rows or 10 rows, i.e., a larger number of pairs of a run range and a level range, than the encoding table 62 shown in FIG. 15. That is, the encoding table 62 shown in FIG. 16 is a 10-code table.

Code 1 or "1Rs" corresponds to the pair of 0 to 1 run range (1 bit) and a level of 1 and is 3 bits in length. "R" takes on a value of 0 or 1 and represents the immediate value of the run in an as-is manner. Code 1 encodes (Run, Level)=(0, 1), (1, 1).

Code 2 or "010RsL" corresponds to the pair of 0 to 1 run range (1 bit) and 2 to 3 level range (1 bit) and is 6 bits in length. "R" takes on a value of 0 or 1 and represents the immediate value of the run in an as-is manner. "L" takes on a value of 0 or 1 and represents the immediate value of the level when an offset of "2" is added.

Code 3 or "011RRsLL" corresponds to the pair of 2 to 5 run range (2 bits) and 1 to 4 level range (2 bits) and is 8 bits in length. "RR" takes on a value from 0 to 3 and represents the immediate value of the run when an offset of "2" is added. "LL" takes on a value from 0 to 3 and represents the immediate value of the level when an offset of "1" is added.

Code 4 or "0010RsLL" corresponds to the pair of 0 to 1 run range (1 bit) and 4 to 7 level range (2 bits) and is 8 bits in length. "R" takes on a value of 0 or 1 and represents the immediate value of the run in an as-is manner. "LL" takes on a value from 0 to 3 and represents the immediate value of the level when an offset of "4" is added.

Code 5 or "0011RRsLL" corresponds to the pair of 6 to 9 run range (2 bits) and 1 to 4 level range (2 bits) and is 9 bits in length. "RR" takes on a value from 0 to 3 and represents the immediate value of the run when an offset of "6" is added. "LL" takes on a value from 0 to 3 and represents the immediate value of the level when an offset of "1" is added.

Code 6 or "00010RRRRRRs" corresponds to the pair of 10 to 73 run range (6 bits) and a level of 1 and is 12 bits in length. "RRRRRR" takes on a value from 0 to 63 and represents the immediate value of the run when an offset of "10" is added.

Code 7 or "00011RRRRRsLLLLL" corresponds to the pair of 0 to 31 run range (5 bits) and 0 to 31 level range (5 bits) and is 16 bits in length. "RRRRR" takes on a value from 0 to 31 and represents the immediate value of the run in an as-is manner. "LLLLL" takes on a value from 0 to 31 and represents the immediate value of the level in an as-is manner.

Code 8 or "00001sLLLLLLLLLLLL" corresponds to the 0 run and 0 to 4095 level range (12 bits) and is 18 bits in length. "LLLLLLLLLLLL" takes on a value from 0 to 4095 and represents the immediate value of the level in an as-is manner.

Code 9 or "000001" corresponds to a code EOB (End of Block) representing the end of a block that indicates that data is all 0s from here onward and is 6 bits in length.

Code 10 or "0000001RRRRRRRRsLLLLLLLLLLLL" corresponds to the pair of 0 to 255 run range (8 bits) and 0 to 4095 level range (12 bits) and is 28 bits in length. "RRRRRRRR" takes on a value from 0 to 255 and represents the immediate value of the run in an as-is manner. "LLLLLLLLLLLL" takes on a value from 0 to 4095 and represents the immediate value of the level in an as-is manner.

The number of appearances and the total bit count of each of codes 1 to 10 are as illustrated in FIG. 16. When the encoding table 62 shown in FIG. 16 is used, more codes with shorter bit lengths are available. This keeps the total bit count in each row to a minimum. As a result, the code size of the compressed texture as a whole is 43,536 bits, thus providing a further reduced code size as compared to when the encoding table 62 shown in FIG. 15 is used.

Each of the encoding tables with immediate value fields 62 according to the present embodiments permits an overlap between the run and level ranges of different codes. If the run and level ranges of two or more codes are applicable, the code with the shortest length is preferentially used.

A description will be given below of variable length decoding using the encoding table with immediate value fields 62 with reference to the encoding table with immediate value fields 62 shown in FIG. 14. In order to find to which of codes 1 to 4 in the encoding table 62 shown in FIG. 14 encoded data applies, it is investigated in which bit "1" appears for the first time in the bit string of the encoded data.

If "1" appears for the first time in the first bit (called "branch A"), encoded data applies to code 1. Then, the immediate value of the run (2 bits), the sign bit, and the immediate value of the level (2 bits) are read one after another from the remaining 5-bit immediate value field.

If "1" appears for the first time in the second bit (called "branch B"), encoded data applies to code 2. Then, the immediate value of the run (5 bits), the sign bit, and the immediate value of the level (5 bits) are read one after another from the remaining 11-bit immediate value field.

If "1" appears for the first time in the third bit (called "branch C"), encoded data applies to code 3. Then, the immediate value of the run (8 bits), the sign bit, and the immediate value of the level (12 bits) are read one after another from the remaining 21-bit immediate value field.

If "1" appears for the first time in the fourth bit (called "branch D"), encoded data applies to code 4, i.e., an EOB.

It is clear from the example showing the numbers of appearances of different codes in FIG. 14 that variable length decoding of compressed texture data that has been variable-length-encoded with the encoding table 62 shown in FIG. 14 results in the texture data passing through branch A highly frequently. Thanks to the characteristic of variable length encoding using the encoding table 62 as shown in FIG. 14, the compute shader of the GPU 200 can perform variable length decoding with high efficiency. The reason for this is that the GPU 200 has an SIMD (Single Instruction Multiple Data) architecture. As a result, a plurality of threads execute the same instruction for different pieces of data at the same time. Therefore, an imbalance between branch conditions contributes to higher concurrency, thus providing improved execution efficiency.

With the GPU 200, a single program counter (PC) references an instruction stored in an instruction cache, and 16 ALUs (Arithmetic Logic Units), for example, execute the instruction referenced by the PC at the same time. For each branch in an "if-then-else" statement loop or a "switch-case" statement loop, a different instruction is set in 16 threads and executed at the same time. In a conditional branch of an if-then-else statement, those threads in charge of the pixels for which the if condition is true (True) of all the 16 threads are enabled and executed in parallel. In an else branch, those threads in charge of the pixels for which the else condition is true (False) of all the 16 threads are enabled and executed in parallel. In a conditional branch of a switch-case statement, those threads in charge of the pixels for which the case condition is true are enabled and executed in parallel.

In a conditional branch of an if-then-else statement, when the number of cases in which the if condition is true and that in which the else condition is true are roughly the same, the threads to be enabled in the true and false cases are changed frequently. However, if there is an imbalance such as if the if condition is true in 80 percent of all the cases, and the else condition is true in 20 percent thereof, the set of threads to be enabled for the true case can be repeatedly used, thus contributing to improved execution efficiency. In a conditional branch of a switch-case statement, when the numbers of cases in which the switch cases are true are roughly the same, the threads to be enabled in the switch cases are changed frequently. However, if there is an imbalance in frequency in which the switch cases are true, the set of threads to be enabled for the highly frequently true switch case can be repeatedly used, thus contributing to improved execution efficiency. This point will be described in detail with reference to FIGS. 17 and 18.

Figure 17:
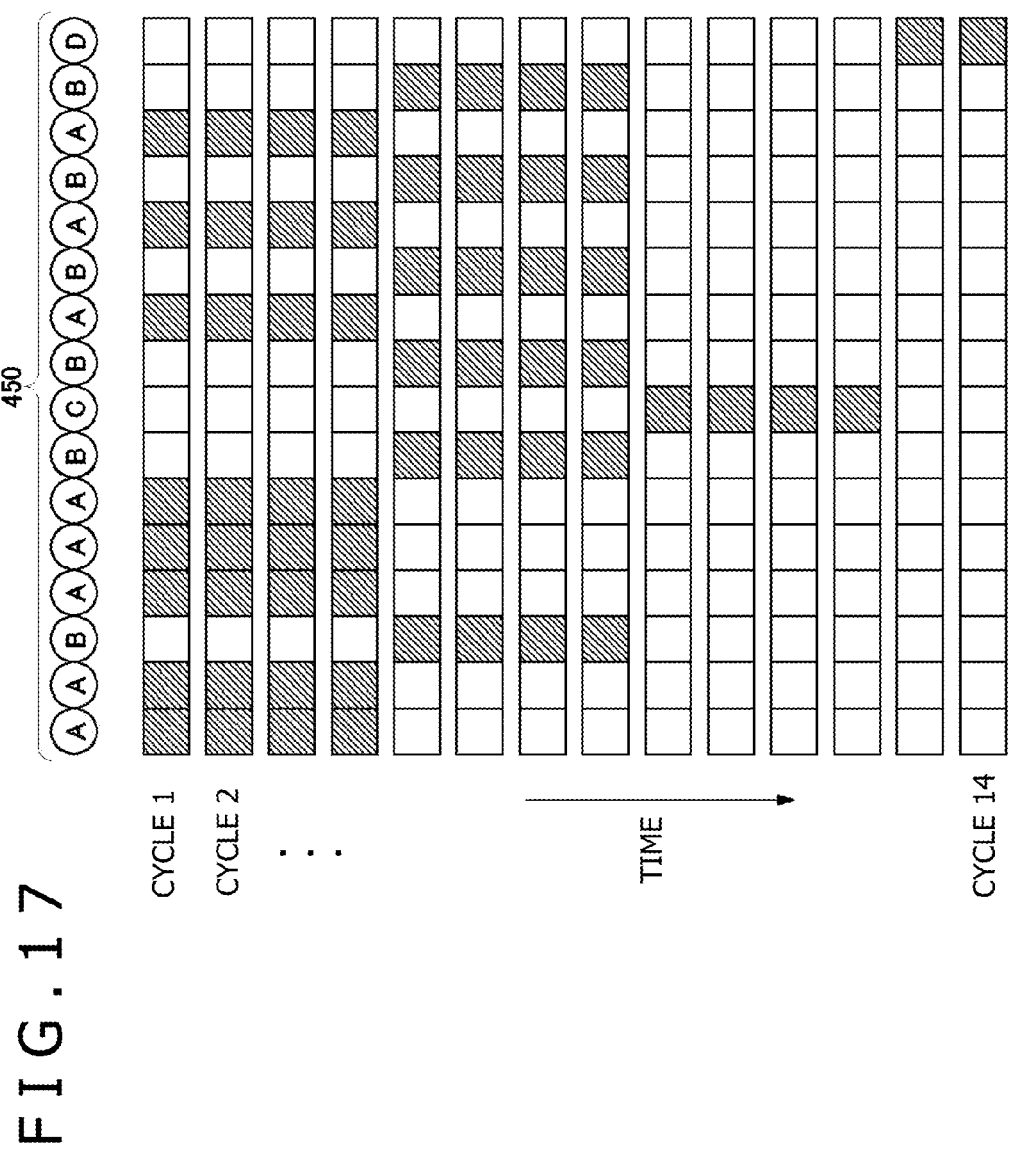
FIG. 17 is a diagram describing the process of executing threads for comparison when there is no imbalance between branch destinations.

FIG. 17 is a diagram describing the process of executing threads for comparison when there is no imbalance between branch destinations.

The GPU 200 includes a plurality of computing units. The number of threads executed simultaneously by each of the computing units of the GPU 200 is determined by the number of arithmetic units in the computing unit. We assume that there are 16 arithmetic units. The group of up to 16 threads that can be simultaneously loaded into a single computing unit will be referred to as a "thread set." Each of the threads included in a thread set executes the same shader program. However, data to be processed is different from one thread to another. If there is a branch in the program, the threads may have different branch destinations. A single computing unit executes a single thread set (up to 16 threads here) in parallel in a given cycle.

For example, even if the number of necessary instructions in each branch destination is a few, instructions in each branch are executed one after another by changing the threads to be executed with a thread mask because of the SIMD structure in which there is one program counter and all the arithmetic units in each of the computing units execute the same instruction.

As an example, we assume that branch A is executed by four instructions, branch B by four instructions, branch C by four instructions, and branch D by two instructions during variable length decoding using the encoding table 62 shown in FIG. 14. In the example shown in FIG. 17, a case will be described in which the branch destinations of the 16 threads in the thread set 450 are sequentially "A," "A," "B," "A," "A," "A," "B," "C," "B," "A," "B," "A," "B," "A," "B," and "D."

In cycle 1, only the threads which will execute branch A (eight threads in this case) are enabled. Four instructions in branch A, i.e., instructions A-1, A-2, A-3, and A-4, are executed while incrementing the program counter one at a time.

In cycle 5, only the thread which will execute branch B (six threads in this case) are enabled. Four instructions in branch B, i.e., instructions B-1, B-2, B3, and B-4, are executed while incrementing the program counter one at a time.

In cycle 9, only the thread which will execute branch C (one thread in this case) is enabled. Four instructions in branch C, i.e., instructions C-1, C-2, C-3, and C-4, are executed while incrementing the program counter one at a time.

In cycle 13, only the thread which will execute branch D (one thread in this case) is enabled. Two instructions in branch D, i.e., instructions D-1 and D-2, are executed while incrementing the program counter one at a time.

As described above, in the example shown in FIG. 17, 14 cycles are necessary for the 16 threads in the thread set to execute all the instructions of the four branches A to D.

Figure 18:
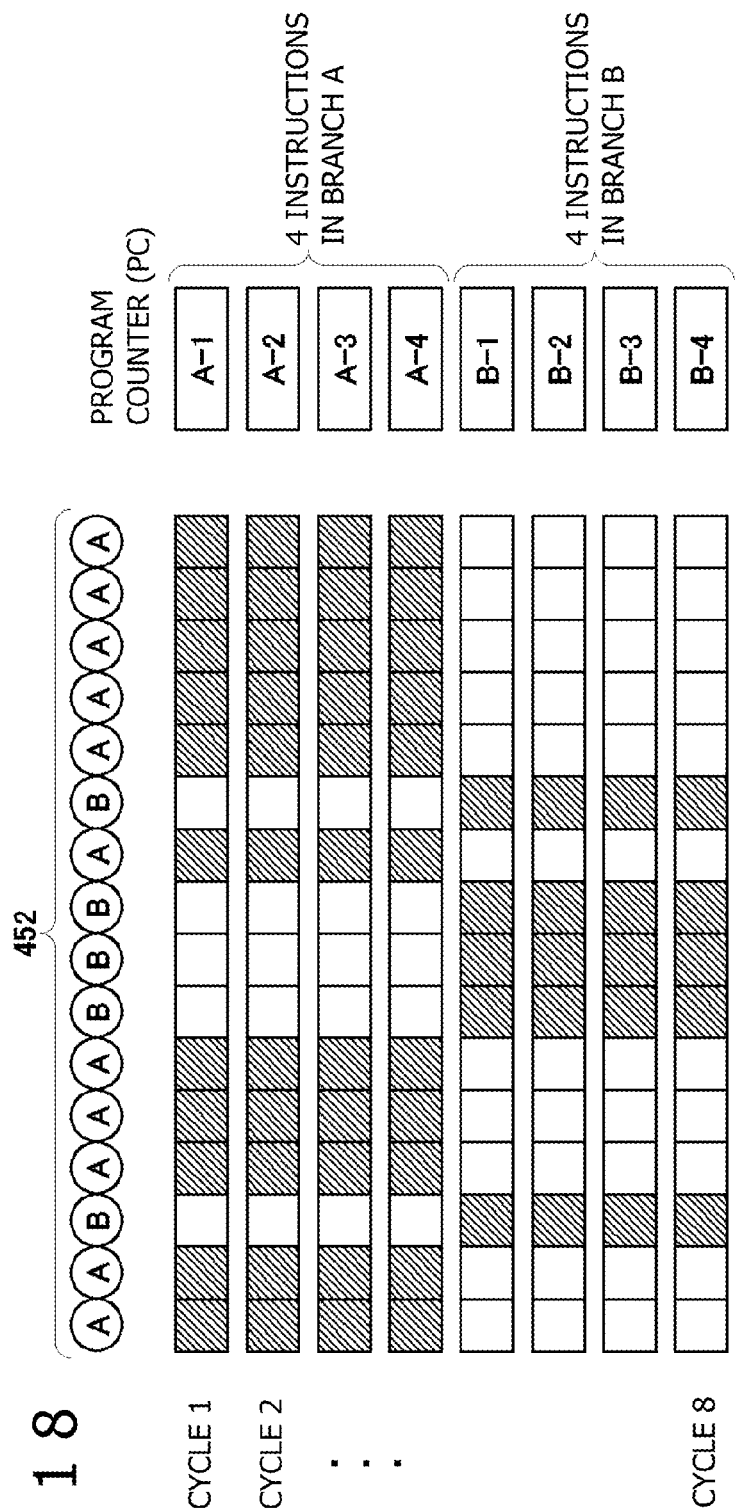
FIG. 18 is a diagram describing the process of executing threads if there is an imbalance between branch destinations.

FIG. 18 is a diagram describing the process of executing threads if there is an imbalance between branch destinations. In the example shown in FIG. 18, a case will be described in which the branch destinations of the 16 threads in the thread set 452 are sequentially "A," "A," "B," "A," "A," "A," "B," "B," "B," "A," "B," "A," "A," "A," "A," and "A." In this example, four branch destinations are available in the shader program. However, there is an imbalance between the pixels for which the branch conditions are true. As a result, only two branch destinations, branches A and B, are available. It is only necessary for the 16 threads in the thread set to execute only these two branches.

In cycle 1, only the threads which will execute branch A (11 threads in this case) are enabled. Four instructions in branch A, i.e., instructions A-1, A-2, A-3, and A-4, are executed while incrementing the program counter one at a time.

In cycle 5, only the threads which will execute branch B (five threads in this case) are enabled. Four instructions in branch B, i.e., instructions B-1, B-2, B-3, and B-4, are executed while incrementing the program counter one at a time.

As described above, in the example shown in FIG. 18, it is only necessary for the 16 threads in the thread set to execute all the instructions of the two branches, i.e., branches A and B. As a result, the number of necessary cycles has reduced to eight cycles.

As described above, if there is an imbalance between program branch destinations due to the characteristic of input data, it is possible to execute instructions repeatedly using the same thread mask without changing it, thus contributing to improved execution efficiency. A variation between branch destinations makes it necessary to change the thread mask for each branch, thus resulting in lower execution efficiency.

Because of the characteristic of the DCT coefficients derived from a natural image, values other than "0" are concentrated in the low frequency components at the top left of the DCT coefficient matrix, with "0s" being consecutive in the high frequency components at the bottom right of the matrix. Therefore, if discrete-cosine-transformed image blocks are converted into a one-dimensional array in a zigzag fashion, the DCT coefficients of all the blocks tend to be data strings that include consecutive non-zero values at first and consecutive zeros later.

In consideration of this tendency of the DCT coefficients, variable-length-encoded data is assigned to threads of a thread set so that these threads handle the DCT coefficients of different DCT blocks, and the thread set is configured so that the threads proceed with variable length decoding of the DCT coefficients at the relatively identical positions in the DCT blocks. In the case of the encoding table 62 shown in FIG. 14, one of branches A to D is selected as a branch destination. Because the DCT coefficients have a similar tendency at the relatively identical positions in the DCT blocks according to the thread set configuration, the threads in the thread set end up having the identical branch destinations. As a result, the threads have identical branch destinations as shown in FIG. 18 rather than having varied branch destinations as shown in FIG. 17. This makes it possible to maintain high efficiency in execution of the thread set for a long time, thus contributing to highly efficient execution of variable length decoding by the thread set.

A detailed description will be given of the procedure for performing variable length decoding using the encoding table with immediate value fields 62 shown in FIG. 16. FIG. 19 is a diagram describing a branch taking place when a search is made to find out to which row of the encoding table 62 shown in FIG. 16 encoded data applies. It is investigated in which bit "1" appears for the first time in the bit string of the encoded data.

If "1" appears for the first time in the first bit, encoded data applies to case 0. If "1" appears for the first time in the second bit, encoded data applies to case 1. If "1" appears for the first time in the third bit, encoded data applies to case 2. If "1" appears for the first time in the fourth bit, encoded data applies to case 3. If "1" appears for the first time in the fifth bit, encoded data applies to case 4. If "1" appears for the first time in the sixth bit, encoded data applies to case 5. If "1" appears for the first time in the seventh bit, encoded data applies to case 6.

Case 0 corresponds to code 1, case 4 to code 8, case 5 to code 9, and case 6 to code 10. Therefore, it is only necessary to read the immediate value of the run or that of the level from the remaining immediate value fields as appropriate.

Case 1 corresponds to codes 2 and 3. It is clear that if the third bit is "0," encoded data applies to code 2 and that if the third bit is "1," encoded data applies to code 3. Then, it is only necessary to read the immediate value of the run or that of the level from the remaining immediate value fields.

Similarly, case 2 corresponds to codes 4 and 5. It is clear that if the fourth bit is "0," encoded data applies to code 4 and that if the fourth bit is "1," encoded data applies to code 5. Further, case 3 corresponds to codes 6 and 7. It is clear that if the fifth bit is "0," encoded data applies to code 6 and that if the fifth bit is "1," encoded data applies to code 7. When it is specified to which code encoded data applies, the immediate value of the run or that of the level is read from the remaining immediate value fields as appropriate.

FIG. 20 is a diagram illustrating a program source code having the branch described in FIG. 19. "clz=FirstSetBit_Hi_MSB(code)" is a calculation formula for finding a row number clz in which "1" appears for the first time in the encoded data bit string. The row number is counted from 0. Therefore, case 0 to case 6 of the switch statement in the program code correspond to case 0 to case 6 in FIG. 19, respectively. Function BITAT(code,n−1,m) is an operation adapted to read m bits of a bit string forward from the nth row of the encoded data bit string.

The source code of the switch statement's case 1 is described. "if (BITAT(code,2,1)==0)" is a case in which the third bit of the encoded data bit string is "0." This case is code 2 shown in FIG. 19. With code 2, it is only necessary to read the immediate value of the run from the fourth bit. Therefore, "run=BITAT(code,3,1)" is executed. Next, the immediate value of the level is read from the sixth bit. However, it is necessary to add an offset of "2." Therefore, "level=BITAT(code,5,1)+2" is executed. It is only necessary to read the sign bit from the fifth bit. Therefore, "sign=BITAT(code,4,1)" is executed.

If "if(BITAT(code,2,1)==0)" is not true, the third bit of the encoded data bit string is "1," which is code 3 in FIG. 19. In this case, the else statement is executed. With code 3, the immediate value of the run is read from the fourth and fifth bits. However, it is necessary to add an offset of "2." Therefore, "run=BITAT(code,4,2)+2" is executed. Here, it should be kept in mind that because BITAT(code,4,2) is an operation adapted to read two bits of a bit string forward from the fifth bit. As a result, the fourth and fifth bits are read. Next, the immediate value of the level is read from the seventh and eighth bits. However, it is necessary to add an offset of "1." Therefore, "level=BITAT(code,7,2)+1" is executed. It is only necessary to read the sign bit from the sixth bit. Therefore, "sign=BITAT(code,5,1)" is executed.

With case 2 to case 6 of the switch statement, it is only necessary to read the immediate value of the run and that of the level from the immediate value fields in accordance with the run range and the level range determined in each row and add an offset as appropriate in the same manner.

FIG. 21 is a diagram illustrating a working example of the encoding table with immediate value fields 62. The encoding table 62 has another two more rows than the encoding table 62 shown in FIG. 16 for encoding with 12 different codes. The run range, the level range, the bit length, and the number of appearances of the code in each row are as shown in FIG. 21.

The characteristics of the codes in the encoding table 62 shown in FIG. 21 can be summarized as follows:
(1) 3- to 12-bit codes are assigned to a level of 1 following zero to 73 consecutive 0s.
(2) 6- to 9-bit codes are assigned to levels of 2 to 4 following zero to nine consecutive 0s.
(3) An 8-bit code is assigned to levels of 4 to 7 following one 0 or less.
(4) A 16-bit code is assigned to levels of 0 to 31 following zero to 31 consecutive 0s.
(5) An 18-bit code is assigned to levels of 32 or more.
(6) A 29-bit code is assigned to arbitrary levels following other arbitrary numbers of consecutive 0s.

Huffman encoding dynamically generates an encoding table in which short codes are assigned to pairs of a frequently appearing run and a frequently appearing level for a given image and in which long codes are assigned to pairs of an infrequently appearing run and an infrequently appearing level for the given image. In contrast, variable length encoding using the encoding table with immediate value fields 62 according to the present embodiment does not dynamically generate the encoding table with immediate value fields 62. Instead, the predetermined encoding table 62 is used. However, the plurality of encoding tables with different immediate value fields 62 may be made available in advance so that these tables can be switched one to another when a condition of some kind is met. Alternatively, an optimal table which provides the smallest code size as a result of variable-length-encoding of a given image may be selected from among the plurality of encoding tables with immediate value fields 62.

The graphics processing system according to the present embodiment uses a texture that has been variable-length-encoded using an encoding table with immediate value fields following discrete cosine transform, thus providing significant reduction in texture size. The compute shader of the GPU 200 performs variable length decoding of a compressed texture using an encoding table with immediate value fields followed by inverse discrete cosine transform, thus allowing for fast decompression of the compressed texture for loading into graphics processing. Highly compressed textures can be resident in a memory. This eliminates the need to read large-size textures from a storage device such as harddisk, thus allowing for execution of PRT on memory. Thanks to compressed textures available on memory, even if compressed textures are read, decompressed, and swapped into the PRT cache as necessary, the latency is short, thus allowing for realtime processing of the textures.

The present disclosure has been described above based on the embodiments. It should be understood by those skilled in the art that the above embodiments are illustrative, that the combination of components and processes can be modified in various ways, and that such modification examples also fall within the scope of the present disclosure.

In the above embodiments, a compressed texture is stored in a memory. However, a compressed texture may be stored in a storage medium such as harddisk or optical disc. A texture is highly compressed, thus keeping the storage capacity to a minimum. Further, although the latency is not as short as when the texture is on memory, it is possible to suppress the latency for reading the texture from the storage medium to a certain extent.

In the above embodiments, discrete cosine transform was used as an example of spatial frequency conversion for converting the spatial domain of an image into a spatial frequency domain. However, other spatial frequency conversion such as discrete Fourier transform may be used instead.

In the above first and second embodiments, consecutive "00s" are encoded as a combination of a specific code "ff" and the length of consecutive occurrences as an example of run length encoding. However, other technique may be used for run length encoding. For example, consecutive occurrences of a value other than "00" may be encoded as a combination of a specific code and the length of consecutive occurrences.

In the above first and second embodiments, a case was described in which a Zlib decoder was available as a piece of hardware. However, the first and second embodiments are also applicable when a decoder is incorporated as a piece of hardware which is designed to decompress data that has been compressed by a compression algorithm other than Zlib.

In the above third embodiment, a description was given of the procedure for decompressing a compressed texture when the GPU 200 includes the variable length decoding section 32 and the IDCT section 40. However, variable length decoding using the encoding table with immediate value fields 62 can be used not only to decompress a compressed texture in a graphics processing system but also to decode a variable-length-encoded image in an ordinary image processor.

The present disclosure contains subject matter related to that disclosed in Japanese Priority Patent Application JP 2014-054021 filed in the Japan Patent Office on Mar. 17, 2014, the entire content of which is hereby incorporated by reference.

What is claimed is:

1. A graphics processing system comprising:
a main processor comprising a partially resident textures (PRT) control section, and a graphics operation section;
a decompression circuit adapted to decompress compressed textures to produce decompressed textures;
a main memory; and
a graphics processing unit (GPU) comprising: (i) a run length decoding section adapted to run-length-decode the decompressed textures to produce run-length-decoded textures, and to match specified level of detail (LOD) values by simultaneously processing a plurality of parallel threads executing a same instruction on different pieces of input data at a same time, where the plurality of parallel threads are subject to an imbalance of program branch destinations caused by varying characteristics of the different pieces of input data, (ii) a reciprocal spatial frequency conversion section adapted to produce restored textures by performing reciprocal spatial frequency conversion on the run-length-decoded textures; and (iii) a graphics processing section adapted to process the decompressed textures,
wherein the main memory includes a texture pool adapted to partially cache the restored textures in a PRT cache,
wherein the graphics operation section receives the LOD values from the GPU and provides the LOD values to the PRT control section, and
wherein the PRT control section: (i) calculates mipmap textures, including multiple resolutions of the restored textures, based on the LOD values, (ii) provides instructions to the GPU to utilize the run length decoding section and the reciprocal spatial frequency conversion section to unarchive the calculated mipmap textures into the PRT cache, and (iii) updates texture mapping by removing pages that are no longer used.

2. The graphics processing system of claim 1, wherein run length decoding of the run length decoding section is performed by a compute shader.

3. The graphics processing system of claim 1, wherein the compressed textures are stored in the main memory, and the run length decoding section reads the compressed textures from the main memory.

4. A non-transitory, computer readable storage medium containing a computer program, which when executed by a computer, causes the computer to carry out a graphics processing method, comprising:
storing compressed textures in a main memory;
decompressing compressed textures to produce decompressed textures;
run length decoding the decompressed textures to produce run-length-decoded textures;
matching specified level of detail (LOD) values by simultaneously processing a plurality of parallel threads executing a same instruction on different pieces of input data at a same time, where the plurality of parallel threads are subject to an imbalance of program branch destinations caused by varying characteristics of the different pieces of input data;

producing restored textures by performing reciprocal spatial frequency conversion on the run-length-decoded textures;

partially caching the restored textures in a partially resident textures (PRT) cache within a texture pool of the main memory;

calculating mipmap textures, including multiple resolutions of the restored textures, based on the LOD values;

utilizing the run length decoding and the reciprocal spatial frequency converting to unarchive the calculated mipmap textures into the PRT cache; and updating texture mapping by removing pages that are no longer used.

5. The non-transitory, computer readable storage medium of claim 4, wherein variable length decoding of the variable length decoding section is performed by a plurality of threads simultaneously of a compute shader based on an imbalance of program branch destinations caused by a limited variation of input data.

6. The non-transitory, computer readable storage medium of claim 4, wherein the compressed texture is stored in the main memory, and the variable length decoding section reads the compressed texture from the main memory.

7. An image decoding method comprising:

storing compressed textures in a main memory;

decompressing the compressed textures to produce decompressed textures;

run-length-decoding the decompressed textures to produce run-length-decoded textures;

matching specified level of detail (LOD) values by simultaneously processing a plurality of parallel threads executing a same instruction on different pieces of input data at a same time, where the plurality of parallel threads are subject to an imbalance of program branch destinations caused by varying characteristics of the different pieces of input data;

producing restored textures by reciprocal spatial frequency converting the run-length-decoded textures and processing the decompressed textures;

partially caching the restored textures in a partially resident textures (PRT) cache within a texture pool of the main memory;

calculating mipmap textures, including multiple resolutions of the restored textures, based on the LOD values;

utilizing the run length decoding and the reciprocal spatial frequency converting to unarchive the calculated mipmap textures into the PRT cache; and updating texture mapping by removing pages that are no longer used.

\* \* \* \* \*